(12) United States Patent
Schillebeeckx et al.

(10) Patent No.: US 11,863,955 B1
(45) Date of Patent: Jan. 2, 2024

(54) SYSTEM AND METHODS FOR PRODUCING, MIXING, AND RECORDING CONTENT

(71) Applicant: Freedman Electronics Pty Ltd, Silverwater (AU)

(72) Inventors: Pieter Schillebeeckx, Silverwater (AU); Jason Flamos, Silverwater (AU)

(73) Assignee: Freedman Electronics Pty Ltd, Silverwater (AU)

( * ) Notice: Subject to any disclaimer, the term of this patent is extended or adjusted under 35 U.S.C. 154(b) by 55 days.

(21) Appl. No.: 17/824,148

(22) Filed: May 25, 2022

(51) Int. Cl.
*H04R 5/04* (2006.01)
*H04R 29/00* (2006.01)

(52) U.S. Cl.
CPC ............ *H04R 5/04* (2013.01); *H04R 29/008* (2013.01); *H04R 2420/01* (2013.01); *H04R 2420/05* (2013.01); *H04R 2420/07* (2013.01); *H04R 2420/09* (2013.01)

(58) Field of Classification Search
None
See application file for complete search history.

(56) References Cited

U.S. PATENT DOCUMENTS

| | | | | |
|---|---|---|---|---|
| 8,300,852 | B2* | 10/2012 | Terada | G10H 1/46 381/119 |
| 8,457,329 | B2* | 6/2013 | Fujita | H04H 60/04 381/119 |
| 2014/0112499 | A1* | 4/2014 | Lintz | H04R 3/00 381/119 |
| 2018/0248635 | A1* | 8/2018 | Saito | G06F 3/04883 |

* cited by examiner

*Primary Examiner* — Paul W Huber
(74) *Attorney, Agent, or Firm* — Lathrop GPM LLP; Richard Beem; Alex Shtraym

(57) ABSTRACT

The present invention relates generally to the field of digital content, and more particularly to an improved system and methods for producing, mixing, and recording content. In particular, the system may include a plurality of input channels to which one or more audio sources may be linked via a user interface. Each audio source may be assigned to a physical fader or a virtual fader for adjusting a level of an audio signal received from the audio source. Advantageously, the system may connect via a wired and/or wireless connection with a number of audio devices and may further facilitate assigning each audio source to an input channel such that content creators, such as podcasters, are able to produce, mix, and record audio contents more efficiently and effectively.

33 Claims, 14 Drawing Sheets

SYSTEM AND METHODS FOR PRODUCING, MIXING, AND RECORDING CONTENT

FIELD OF THE INVENTION

The present invention relates generally to the field of digital content, and more particularly to a system and methods for producing, mixing, and recording digital content.

BACKGROUND

Podcasting generally refers to the distribution of multimedia content over a network. Such content may include, for example, audio and video files and other media events, and may be published over the Internet using, for example, Really Simple Syndication (RSS) or Atom syndication format. Through use of web syndication, podcasters (the host or author of a podcast) may automatically distribute content to large audiences.

Traditionally, mixing consoles have been used to assemble, sequence, and edit content prior to distribution. Mixing consoles are often separated into two broad categories: analog and digital. Each category has advantages and disadvantages.

Analog mixing consoles may include an array of input controls, such as switches, knobs, and faders. Input controls may facilitate conditioning and routing audio signals according to parameters set by the operator. Conditioning may include, for example, adjusting the signal intensity of an overall audio signal or adjusting the signal intensity in a specified frequency range. Parameters can include, for example, values for applying a gain to an audio signal or values for adjusting the signal intensity over a specified frequency range. However, analog mixers may be limited in function based on the number of input controls available to a user. In order to expand the functionality of analog consoles, additional physical circuits and controls may be needed. As such, analog consoles are often large, expensive, and contain inherent physical limitations.

On the other hand, digital mixing consoles are typically designed to emulate the form and function of analog recording consoles, but instead work with digitized audio to exploit workflow, size, repeatability or compatibility benefits preferred in certain production settings. Digital mixing consoles may be configured to process audio streams or be coupled to external hardware or software. Like analog consoles, digital consoles may provide dedicated virtual input controls and, in addition, may be configured to vary and expand on the functionality of physical knobs and buttons. That is, virtual input controls on a digital console may be programmable and provide access to more parameters. This allows the digital console to control more audio channels and/or more parameters than there are knobs or buttons.

However, there are several reasons why content creators and production studios have been slow to change from analog to digital. For instance, digital consoles often do not function on a level comparable to analog consoles that use hardware controls. Furthermore, digital mixing consoles often require an extensive amount of training for a user to operate them efficiently. As a result, an experienced audio professional may be required to page through multiple layers of on-screen menus to locate the desired feature on the mixer.

Therefore, there is a need for a system and methods by which content creators, such as podcasters, are able to produce, mix, and record audio contents more efficiently and effectively. The present invention satisfies this need and provides further related advantages.

SUMMARY

The present invention relates generally to the field of digital content, and more particularly to a system and methods for producing, mixing, and recording digital content.

In one aspect, the system may include a plurality of input channels to which one or more audio sources may be linked via a user interface. Each audio source may be assigned to a physical fader or a virtual fader for adjusting a level of an audio signal received from the audio source. Advantageously, the system may connect via a wired and/or wireless connection with a number of audio devices and may further facilitate assigning each audio source to an input channel such that content creators, such as podcasters, are able to produce, mix, and record audio contents more efficiently and effectively.

In one aspect, the system may include a processor that is operative to detect a connection to an audio source. The system may then output, via an interface, a set-up screen configured to receive user inputs for linking the audio source to one or more input channels. In response to the user input, the system may assign the audio source to a physical fader or a virtual fader. Once assigned, the system may be configured to adjust, in response to a user input via the assigned fader, a level of an audio signal received from the audio source. The adjusted level of the audio source may be displayed in real-time via the interface.

In another aspect, the system may include a plurality of connectors for coupling with one or more audio sources. In particular, the system may include USB capability that facilitates bi-direction communication with the one or more devices. In other words, the system may, via USB ports, act as a USB host, a USB device, and combinations of both. For example, the system may be a master device and configured to control a peripheral, such as a microphone. In another example, the system may be connected to a master device and configured to act as an audio peripheral of the master device.

In yet another aspect, the system may include a range of audio processing presets. Audio processing presets may be mapped to various parameters associated with an audio signal. Adjustment of one or more preset controls may linearly change one or more parameters associated with said preset. Alternatively, adjustment of one or more preset controls may have a curved or nonlinear change corresponding to the underlying parameters. Preset controls may be accessed, created, and/or stored via a graphical interface of the system.

The system may be used to record one or more audio signals from one or more audio sources. In particular, the system may store recorded audio in an internal or external memory. For example, the system may include a slot for receiving an SD memory card configured to record audio. For example, through use of the system, a user may produce, mix, record a podcast for distribution.

While the invention is susceptible to various modifications and alternative forms, specific exemplary embodiments thereof have been shown by way of example in the drawings and have herein been described in detail. It should be understood that there is no intent to limit the invention to the particular embodiments disclosed. On the contrary, the intention is to cover all modifications, equivalents, and alternatives falling within the scope of the invention as defined by the appended claims.

BRIEF DESCRIPTION OF THE DRAWINGS

Embodiments are illustrated by way of example and not limitation in the figures in the accompanying drawings, in which like references indicate similar elements and in which.

DETAILED DESCRIPTION OF THE INVENTION

The present invention relates generally to the field of digital content, and more particularly to an improved system and methods for adjusting properties of audio signals and controls of an audio mixing console. In particular, the console may include a plurality of input channels to which one or more audio sources may be linked via a user interface. Each audio source may be assigned to a physical fader or a virtual fader for adjusting a level of an audio signal received from the audio source. Advantageously, the console may connect via a wired and/or wireless connection with a number of audio devices and may further facilitate assigning each audio source to an input channel such that a user may adjust various audio properties corresponding to each audio signal for producing, mixing, and recording digital content.

Figure 1:
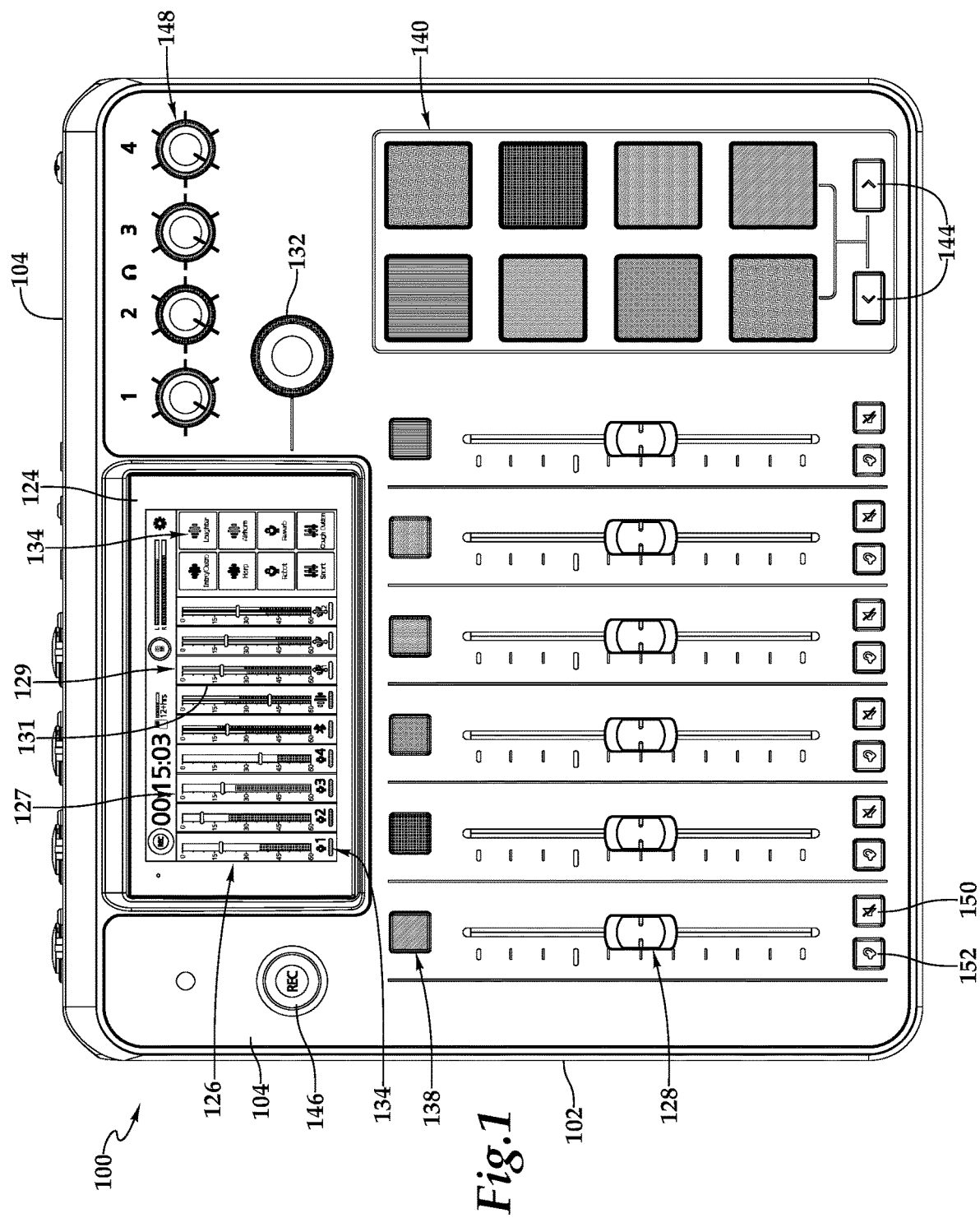
FIG. 1 illustrates a top view of an exemplary audio mixing system.
Figure 2:
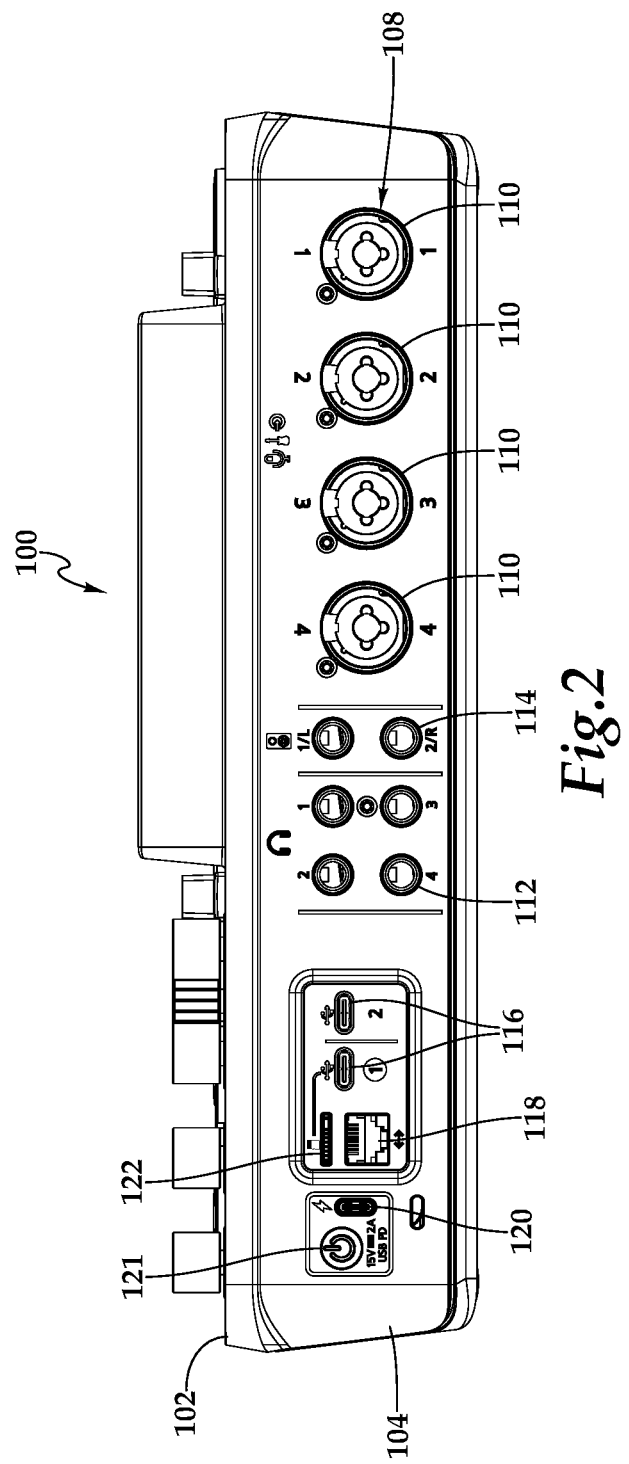
FIG. 2 illustrates a rear view of the audio mixing system.
Figure 3:
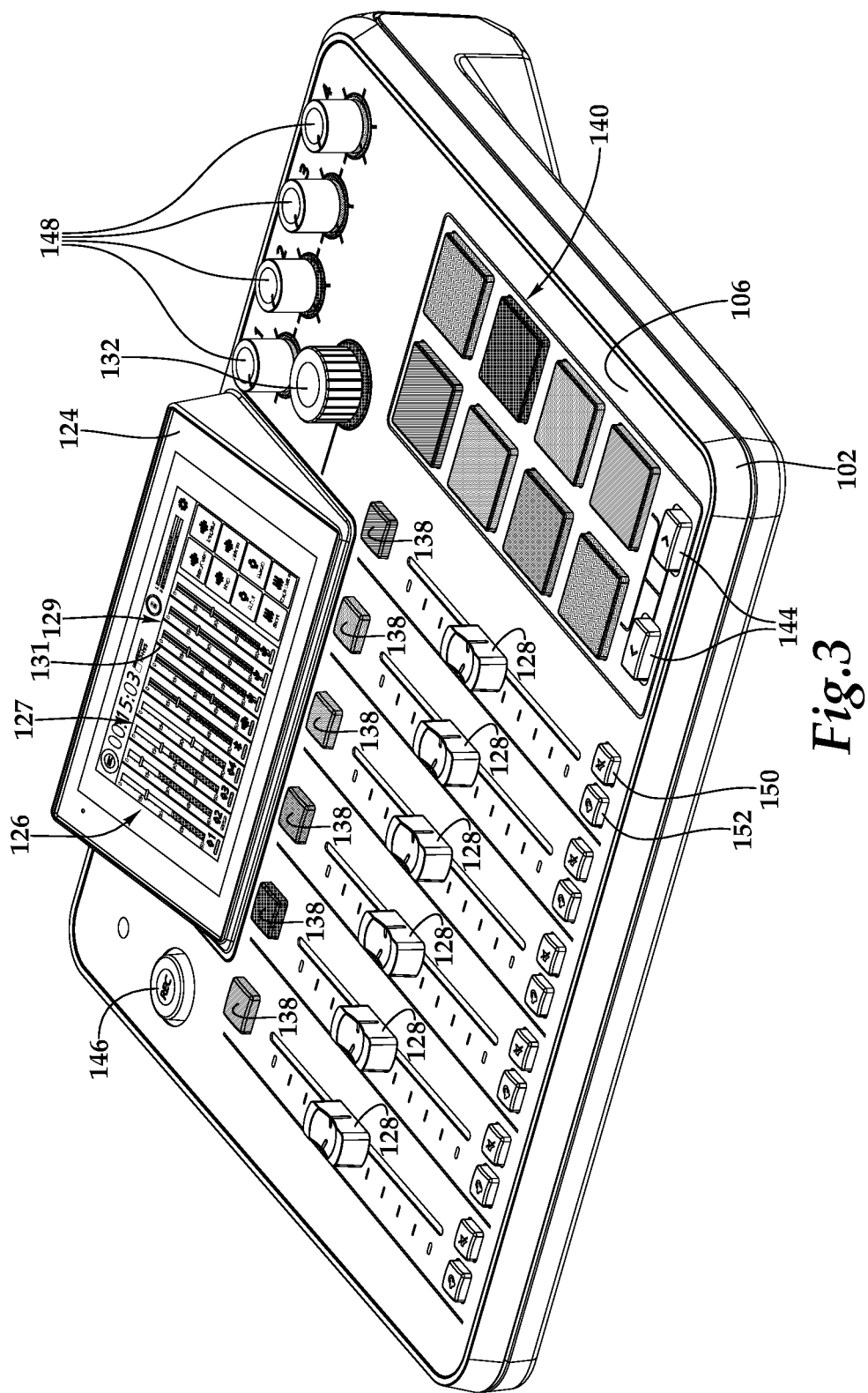
FIG. 3 illustrates a perspective view of the audio mixing system.

Turning now to the drawings wherein like numerals represent like components, FIGS. 1-3 illustrate an exemplary audio mixing system 100. System 100 may communicate via wired and/or wireless connections with a wide range of devices, such as mobile devices, microphones, and musical instruments including, for example, a guitar, keyboard, drums, and the like. In addition, system 100 may be configured to output audio signals to, for example, mobile devices, speakers, and, headphones. It is further contemplated that the system 100 may communicate both via wired (e.g., Ethernet) and wireless networks simultaneously.

As shown, system 100 may include a console 102 configured to be portable and easily moved from one location to the next. In particular, console 102 may range between about ten and about fifteen inches in length, and preferably be between about twelve inches and about fourteen inches long. A width of console 102 may range between about eight inches and about thirteen inches, and preferably be between about ten inches and about twelve inches wide. Further, console 102 may range between about two inches and about five inches in height. In one embodiment, console 102 may be approximately thirteen and three quarter inches long, approximately ten and three quarter inches wide, and approximately three and a quarter inches high.

FIG. 2 illustrates a rear section 104 of console 102. Rear section 104 may include a plurality of connectors 108 for receiving inputs and/or transmitting outputs to one or more devices. As shown, connectors 108 may include a XLR-TRS jack combo port 110, headphone jack ports 112, speaker jack ports 114, universal serial bus ports (USB ports) 116, an Ethernet port 118, and a power source port 120. In addition, system 100 may be turned on and off by use of a power switch 121. It is contemplated that the configuration and number of connectors may vary. For instance, other sections of system 100 may have the same or different connectors, such as RCA ports, HDMI ports, and hi-z ports.

As shown in FIG. 2, rear section 104 may include at least two USB ports 116 to facilitate dual USB capabilities. Each USB port 116 may permit system 100 to act as a USB host and/or a USB device. In other words, system 100 may be the "master" device and facilitate controlling a peripheral device, such as a microphone. Further, system 100, via USB ports 116, may coupled with, for example, a computer or smartphone that acts as the "master" device such that system 100 functions as a peripheral. Also, system 100 may function as a host (e.g., when coupled to a microphone) via one USB port and as a peripheral (e.g., when coupled to a computer) via another USB port.

Further, USB ports 116 may be configured as separately addressable interfaces that can be used independently of each other. In one instance, USB ports 116 may facilitate connecting system 100 to two computers. Each computer may recognize system 100 as a USB audio device such that system 100 may be configured to receive the audio output from each computer via USB ports 116. In another instance, USB ports 116 may facilitate bi-directions communication with two external devices such that audio signals output by system 100 may be transmitted to each external device. Moreover, the audio signals output by system 100 may be independent of one another such that system 100 may be configured to transmit different audio signals—such as a mix-minus feed, a live streaming feed, or a recorded feed—to each external device.

In addition, system 100, when functioning as a USB device, can be configured to offer multiple USB audio signals via a single USB interface. In other words, system 100 may allow for a user to choose from multiple USB audio sources coupled to their host devices (such as a smartphone), and receive audio signals from different applications of the host device. System 100 may present each audio source coupled to the host device as an input source on system 100 such that the corresponding audio signals may be manipulated, as detailed below. Moreover, system 100 may be configured to transmit multiple audio signals back to the host device via USB ports 116 to, for example, perform telephonic functions, interact with communication applications, and the like.

Further, connectors 108 of rear surface 104 may facilitate recording information. For instance, system 100 may be configured to record audio to an internal memory and/or an external drive coupled to one or more connectors 108. Further, rear surface 104 may include a slot 122 for receiving a removable storage device, such as an SD card that may be configured to record audio signals received and/or produced by system 100.

FIG. 1 and FIG. 3 further illustrate a top section 106 of console 102. As shown, top section 106 may include an interface 124, such as the exemplary graphical user interface (GUI). As shown in FIG. 3, console 102 may be structured such that interface 124 may be tilted or angled for comfort and visibility. More specifically, a tilt angle of interface 124 may range between about zero degrees and about ninety degrees with respect to top section 106.

Further, system 100 may include a plurality of input channels 126 to which one or more audio source is linked. Input channels 126 may be visually represented via interface 124. Examples of audio sources that may be linked to one or more input channels 126 may include, but are not limited to, microphones, musical instruments, Bluetooth devices, USB audio devices, iOS devices, memory or microSD cards, external USB drives, and internal audio recordings.

As shown, top section 106 may further include various mechanical and electromechanical physical controls, such as toggles, knobs, slides, buttons, and the like. Specifically, top section 106 may include one or more physical faders 128. In one embodiment, top section 106 may include six physical faders 128. Each physical fader 128 may be a slider that is configured to move up and down for adjusting a level of a corresponding audio source. While illustrated to have six physical faders, it is contemplated that system 100 may have any number of physical faders.

Figure 4:
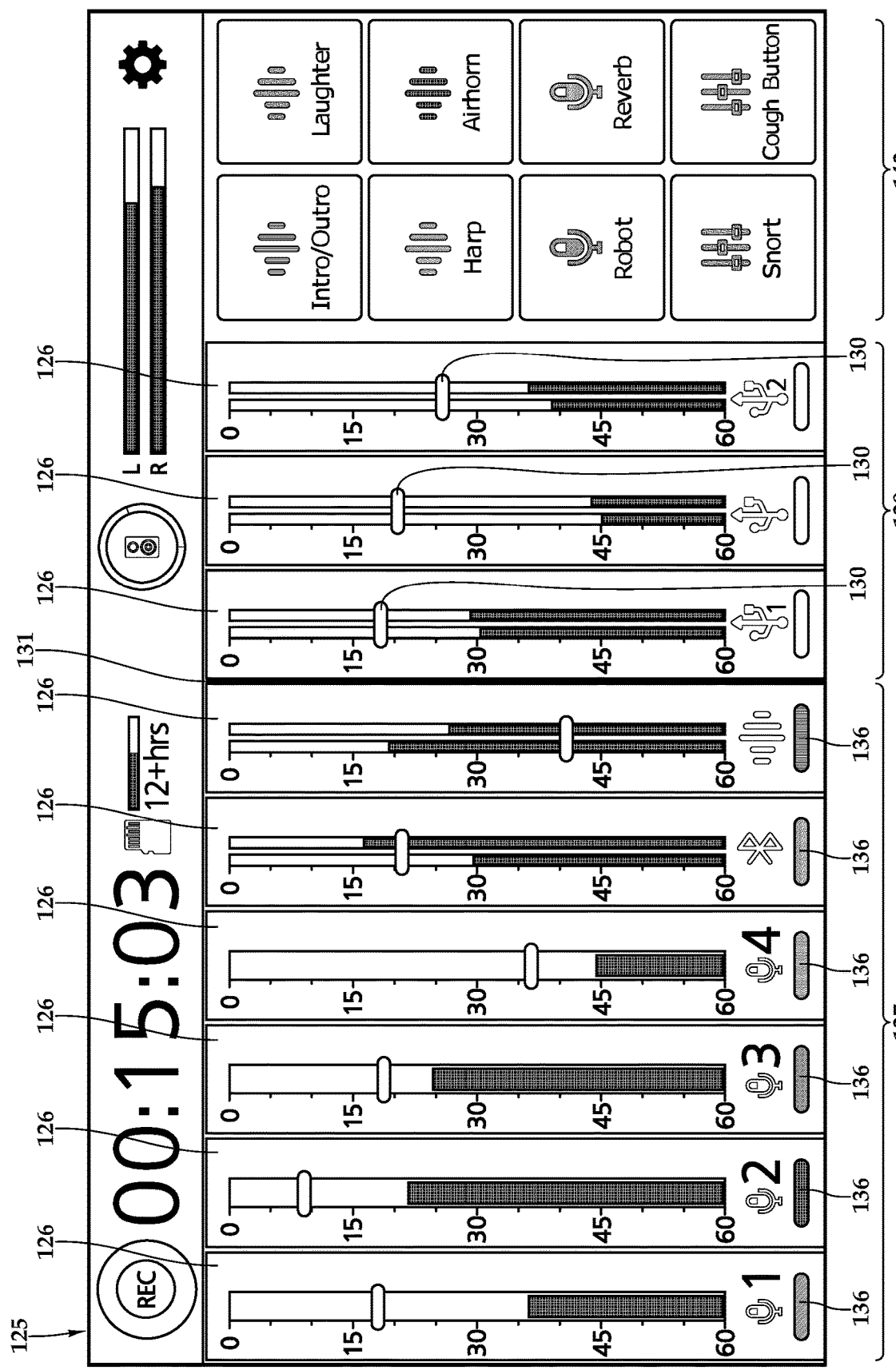
FIG. 4 illustrates an exemplary home screen displayed via an interface of the audio mixing system.

FIG. 4 illustrates an exemplary home screen 125 of console 102. Exemplary home screen 125 may be displayed via graphical interface 124. As shown, one or more virtual faders 130 may be displayed on home screen 125. In particular, system 100 may be configured to display, via interface 124, at least one region 127 representing audio sources linked to said one or more physical faders 128 and another region 129 representing audio sources linked to said one or more virtual faders 130. The regions may be separated by a boundary line 131 such that a user may distinguish between the region 127 associated with physical faders 128 and the region 129 associated with virtual faders 130.

Like physical faders 128, virtual faders 130 may be configured to adjust a level of an audio signal received by counsel 100. In particular, the level of an audio source controlled by virtual faders 130 may be adjusted via a physical control on top surface 106. Specifically, virtual faders 130 may be adjusted via a rotary encoder 132, which may be configured to convert a movement into an analog or digital output signal.

Each fader 128, 130 may be assigned to one or more audio sources, which may be linked to one or more input channels 126. In other words, any audio source can be assigned to any fader 128, 130 to best suit the needs and ergonomics of the user. Stereo sources may be assigned to a single fader or may be split across two faders. Mono sources, such as analog inputs, may also be combined into stereo pairs, and routed to a single fader 128, 130.

The assignment of one or more physical faders 128 to one or more audio sources or input channels 126 may be visually represented by system 100. More specifically, system 100 may be configured to display one or more indicators 134 via interface 124. Indicators 134 may visually correspond to one or more physical controls. For example, as shown in FIG. 4, system 100 may display, via interface 124, indicators 134 as strips or bars 136 having a color selectable by a user. To visually represent the assignment of a physical fader to an audio source or input channel, system 100 may be configured to illuminate (e.g., using a matching or similar color) one or more access buttons 138 positioned above the corresponding physical fader on top section 106. As detailed below, in response to a user pressing access button, system 100 may be configured to display, via interface 124, a screen that facilitates processing, manipulating, and/or editing an audio signal associated with the access button.

Further, indicators 134 displayed via interface 124 represent one or more predefined actions available to a user via system 100. Examples of predefined actions may include record an audio signal, play an audio signal, mix audio signals, present a screen on the interface, display information, and the like. Predefined actions may be assigned to one or more physical pads 140. In particular, indicators 134 displayed via interface 124 may represent a predefined action as a virtual pad 142 having a color selectable by a user. To visually represent the assignment of a physical pad to a predefined action, system 100 may be configured to illuminate the corresponding physical pad a color that matches or is similar to the color of virtual pad 142. In addition, system 100 may include scroll buttons 144 for visually scrolling through predefined actions available via selection of physical pads 140.

Referring back to FIG. 1 and FIG. 3, top section 106 may further include a mute toggle 150 and a solo toggle 152 for each input channel that corresponds to a physical fader 128. The functionality associated with mute toggle 150 and solo toggle 152 may also be available to a user via interface 124. For example, a user, via user interface 124, may tap on an input channel shown on interface 124 to initiate a mute/solo overlay. Further, system 100, in response to detecting an input corresponding to an input channel 126 displayed on interface 124, may facilitate activating a listening mode or enable a talkback mode.

As discussed above, system 100 may be configured to record one or more audio signals to an internal or external memory. In one aspect, a user may begin or end a recording via record switch 146. For instance, record switch 146 may illuminate a red color in response to activation by a user to represent that system 100 is recording one or more audio signals. In response to a user pressing record switch 146 a second time, system 100 may end the recording and store the recorded audio signal in an internal or external memory based on, for example, a user preference.

In addition, as shown, top section 106 may include one or more knobs 148 configured to adjust an output level of an audio signal. Knobs 148 may correspond to one or more connectors 108 of rear section 104. For example, knobs 148 may facilitate adjusting the level of an audio signal output via headphone port 112.

Exemplary User Interface Screens

FIG. 5A through FIG. 9 illustrate additional exemplary screens of user interface 124. Through use of interface 124, system 100 may facilitate various production, mixing, and recording features relating to one or more audio signals. System 100 may further be configured to create, store, and distribute a podcast show, which may be named and associated with an icon via interface 124, as detailed below. Other shortcuts to various features and settings may be including throughout interface 124 to increase usability and provide a better user experience. The various screens of interface 124 may facilitate certain navigation and user gesture techniques to create a user-friendly graphical user interface.

Figure 5A:
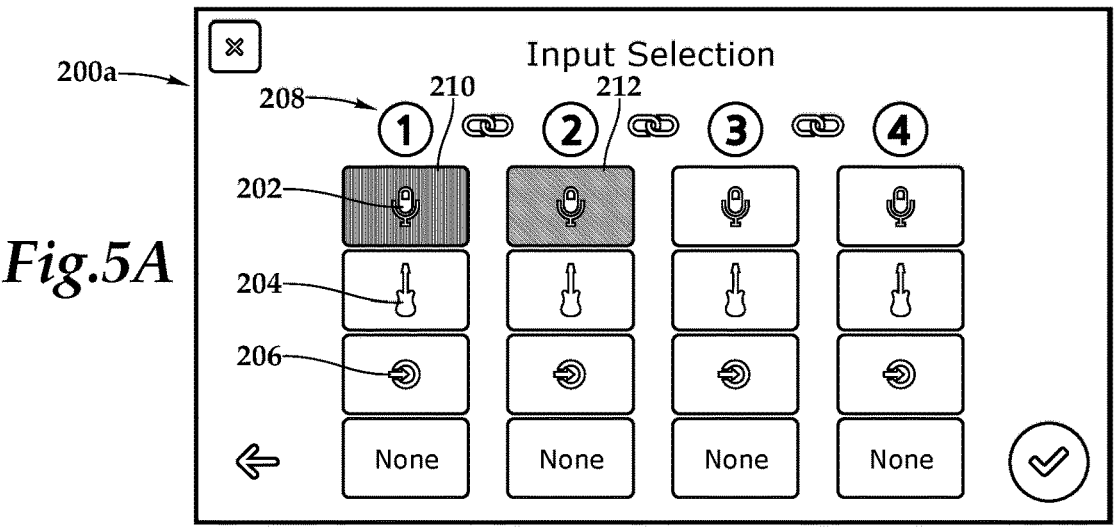
FIG. 5A illustrates an exemplary input selection screen displayed via the interface of the audio mixing system.

FIGS. 5A-5N illustrate an exemplary sequence of input setup operations that may be displayed via interface 124. The exemplary sequence of operations may be replicated or repeated for each audio source connected to system 100.

Figure 5B:
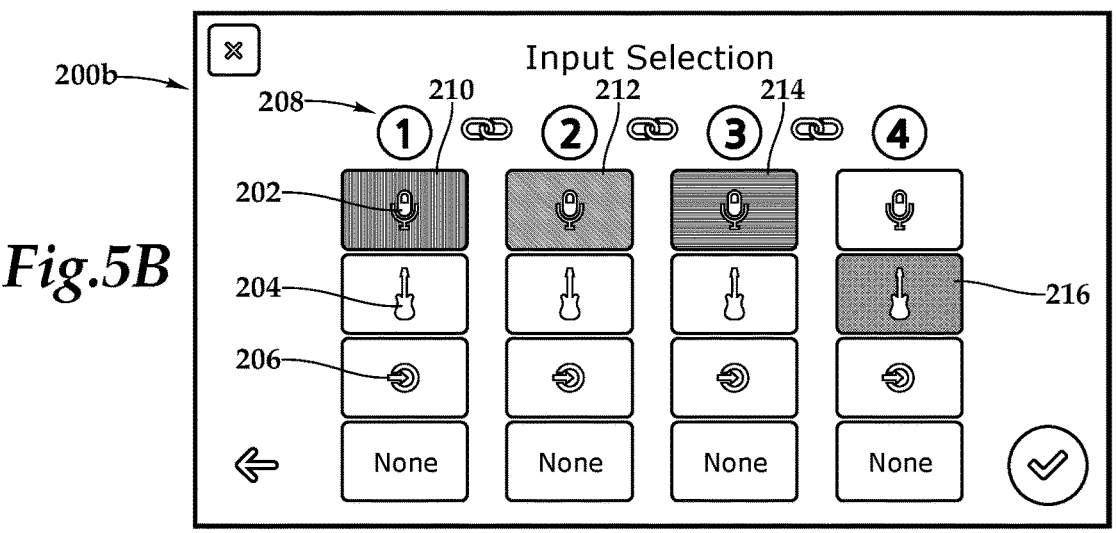
FIG. 5B illustrates another exemplary input selection screen displayed via the interface of the audio mixing system.

More specifically, FIG. 5A and FIG. 5B illustrate input selection screens 200a, 200b corresponding to physical inputs connected to system 100 via one or more connection 108. As shown, input selection screens 200a, 200b may display a plurality of images corresponding to one or more audio source, such as a microphone 202, musical instrument 204, and line in 206. In response to system 100 detecting, automatically or in response to a user input, a connection to one or more audio sources, input selection screens 200a, 200b may represent that detection by emphasizing a corresponding image under a connected position 208. For instance, input selection screens 200a, 200b may emphasize a sign corresponding to an audio input. Examples of emphasizing may include highlighting or filling in the corresponding sign or a background associated with the sign.

As illustrated in exemplary input selection screen 200a, interface 124 is shown to emphasize two inputs 210, 212 to represent microphones connected to system 100 in a first position and a second position. Further, as illustrated in exemplary input selection screen 200b, interface 124 is shown to emphasize four inputs 210, 212, 214, 216 to represent microphones connected to system 100 in a first, second, and third position and a musical instrument connected to a connector in a fourth position.

Figure 5C:
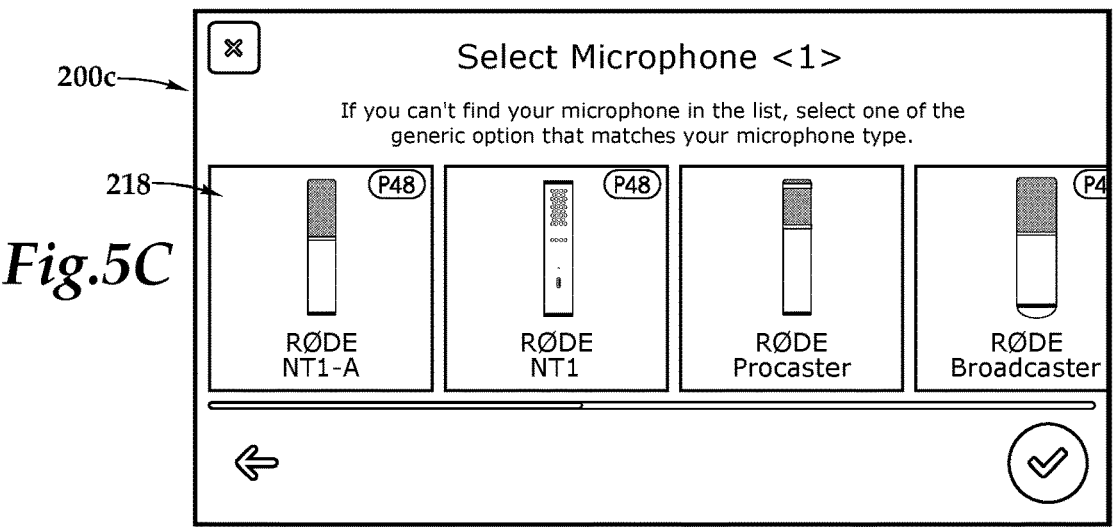
FIG. 5C illustrates an exemplary device selection screen displayed via the interface of the audio mixing system.

Once system 100, automatically or in response to a user input, detects a connection to one or more audio sources, the sequence may move to an exemplary device selection screen 200c as illustrated in FIG. 5C. Through use of device selection screen 200c, a user may choose from a variety of predefined options 218 relating to each audio source connected to system 100. Each predefined option 218 may correspond to predefined audio properties or characteristics, which may be stored in a memory of system 100, as detailed below. For example, as shown, device selection screen 200c may display predefined options 218 "RØDE NT1-A," "RØDE NT1," "RØDE Procaster," and "RØDE Broadcaster" as options that correspond to microphone input 210.

Figure 5D:
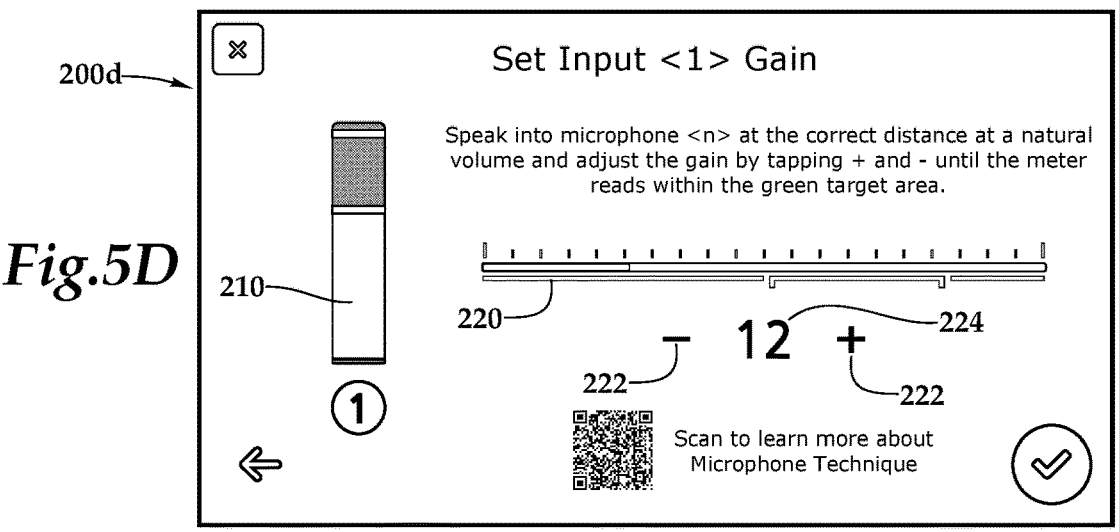
FIG. 5D illustrates an exemplary gain screen displayed via the interface of the audio mixing system.

Once the user has selected a predefined option 218, the sequence of operations may move to an exemplary gain screen 200d as illustrated in FIG. 5D. Gain screen 200d may include a meter 220 for visualizing the gain of an audio signal received by system 100. Further, gain screen 200d may include controls 222 that facilitates adjusting a level 224 of gain for the corresponding audio source. For example, as shown, gain screen 200d may display a gain of "12 dB" corresponding to the audio signal received from an audio source, such as microphone input 210.

Figure 5E:
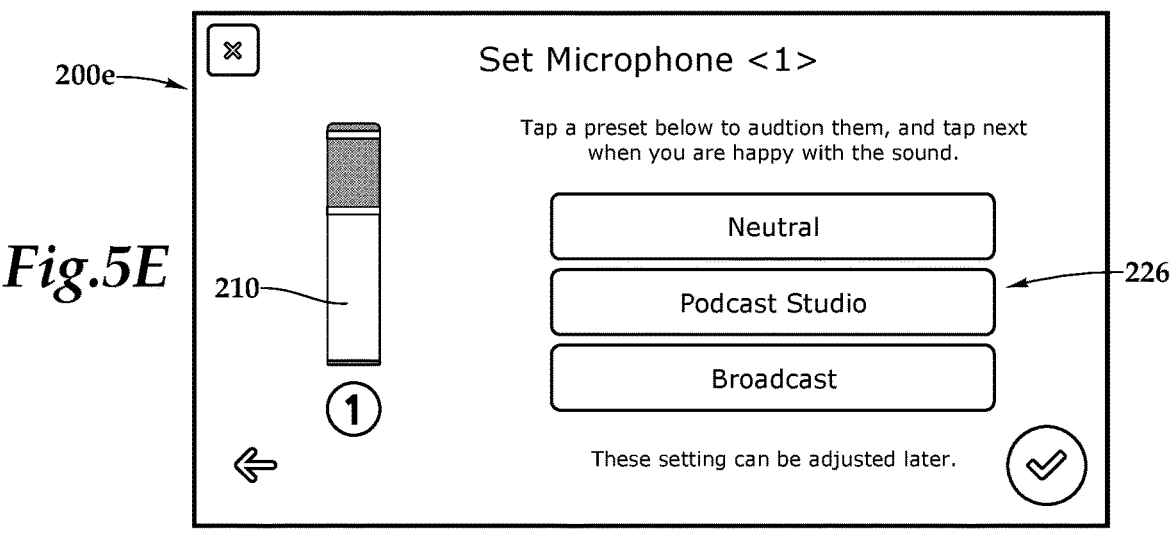
FIG. 5E illustrates an exemplary audio source preset screen displayed via the interface of the audio mixing system.

Once a gain level 224 has been set, the sequence of operations may move to an exemplary preset screen 200e as illustrated in FIG. 5E. Preset screen 200e may include one or more source audio options 226 corresponding to the audio input source. Source audio options 226 may, in response to a user input, be output to the user. Source audio options 226 may include predefined audio properties or characteristics for various microphones, instruments, and playback devices. For example, as shown, preset screen 200e may display audio options 226 "Neutral," "Podcast Studio," and "Broadcast" as predefined audio property options that correspond to microphone input 210.

Figure 5F:
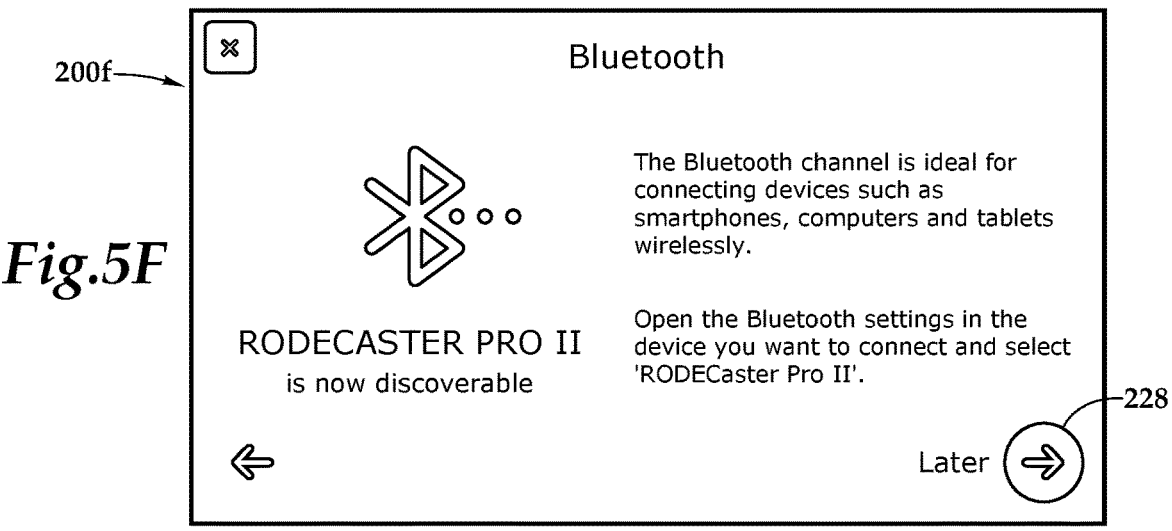
FIG. 5F illustrates an exemplary wireless connection screen displayed via the interface of the audio mixing system.

The exemplary sequence of operations may further include a wireless connection screen 200f as illustrated in FIG. 5F. When wireless connection screen 200f is displayed, system 100 may be discoverable by another device, such as via Bluetooth or any other wireless communication technique. A user may skip this step by selecting the "Later" button 228.

Figure 5G:
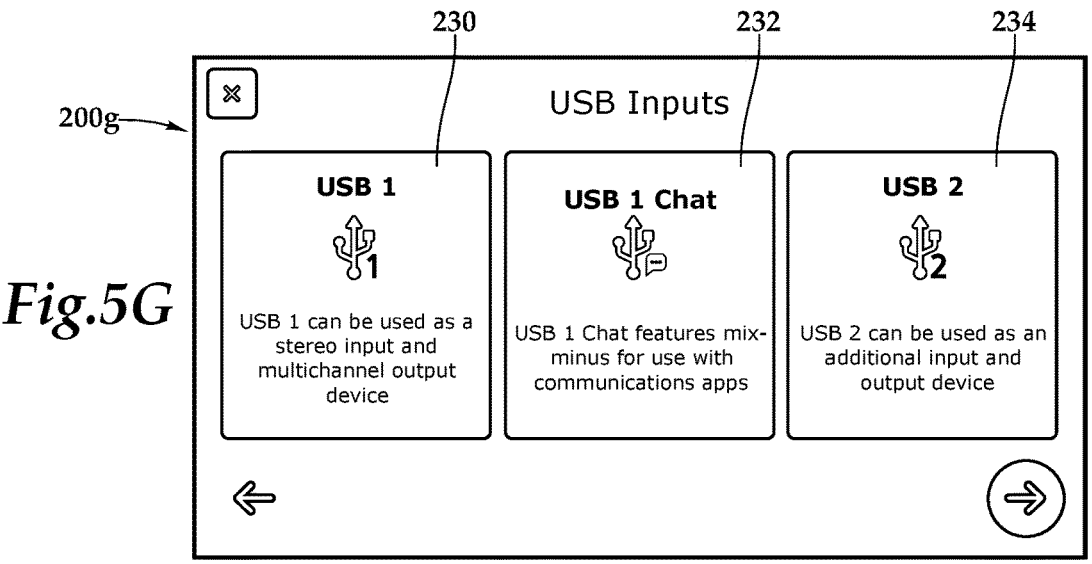
FIG. 5G illustrates an exemplary USB input screen displayed via the interface of the audio mixing system.

Once system 100 is wireless connected to another device or in response to a user selecting later button 228, the sequence of operations may move to a USB input screen 200g as illustrated in FIG. 5G. USB input screen 200g may facilitate selecting configurations corresponding to a device coupled to system 100, such as via USB ports 116. More specifically, a first USB configuration 230 may configure a connected device to be used as a stereo input and/or a multichannel output device. A second USB configuration 232 may configure a connected device to be used for use with communications apps. For example, second USB configuration 232 may provide for a mix-minus audio signal that may be designed to avoid feedback and echo in a conference or telephone interface application. A third USB configuration 234 may configure a connected device to be used as an additional input and/or output device.

Figure 5H:
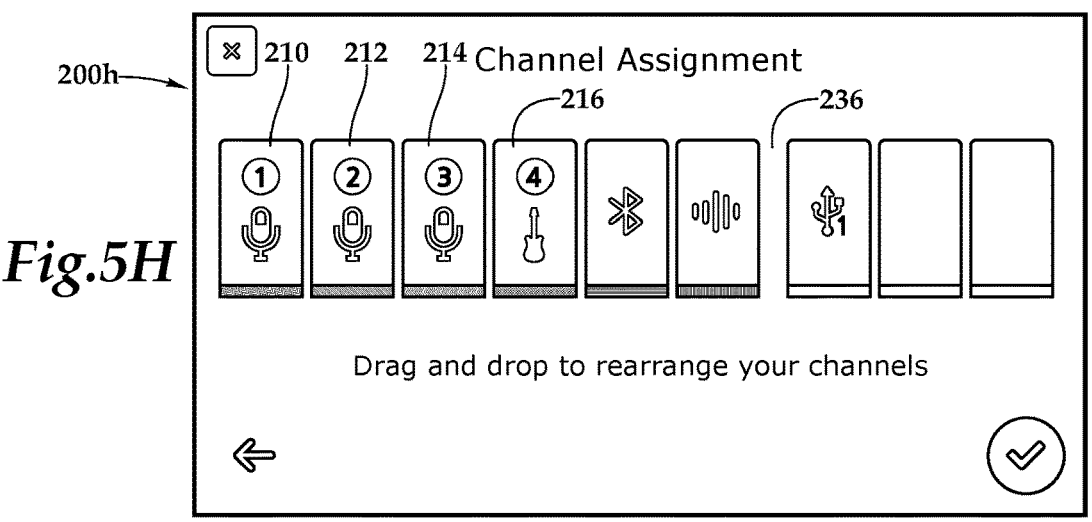
FIG. 5H illustrates an exemplary channel assignment screen displayed via the interface of the audio mixing system.

Once a USB configuration has been applied, the sequence of operations may move to an exemplary channel assignment screen 200h as illustrated in FIG. 5H. Through use of channel assignment screen 200h, a user may, via an input, drag and drop each audio input to, for example, rearrange the order of input channels. For instance, a user may switch microphone input 210 with instrument input 216, thereby rearranging the order of input channels such that a first input channel is associated with instrument input 216 and a fourth input channel is associated with microphone input 210. As shown on channel assignment screen 200h, a gap 236 between input channels may separate input channels linked to physical faders, positioned in a region left of gap 236, and input channels linked to virtual faders, which may be positioned in a region to the right of gap 236.

Figure 5I:
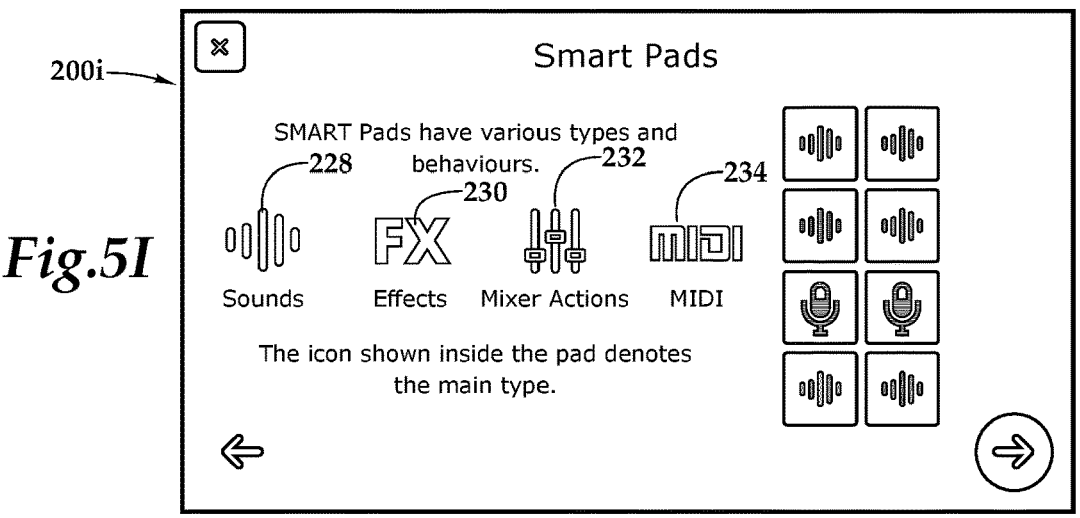
FIG. 5I illustrates an exemplary actions screen displayed via the interface of the audio mixing system.

Once audio inputs have been assigned via channel assignment screen 200h, the sequence of operations may move to an exemplary actions screen 200i as illustrated in FIG. 5I. Through use of actions screen 200i, a user may assign one or more actions to one or more pad, such as physical pads 140 (FIGS. 1-3). As detailed above, predefined actions may be represented as virtual images, such as virtual pads 142. For instance, exemplary actions that may be assigned to physical pads 140 and represented as virtual pads 142 may include playing a sounds 228 or effects 230, utilizing one or more audio mixing applications 232 or setting a communication standard 234.

Figure 5J:
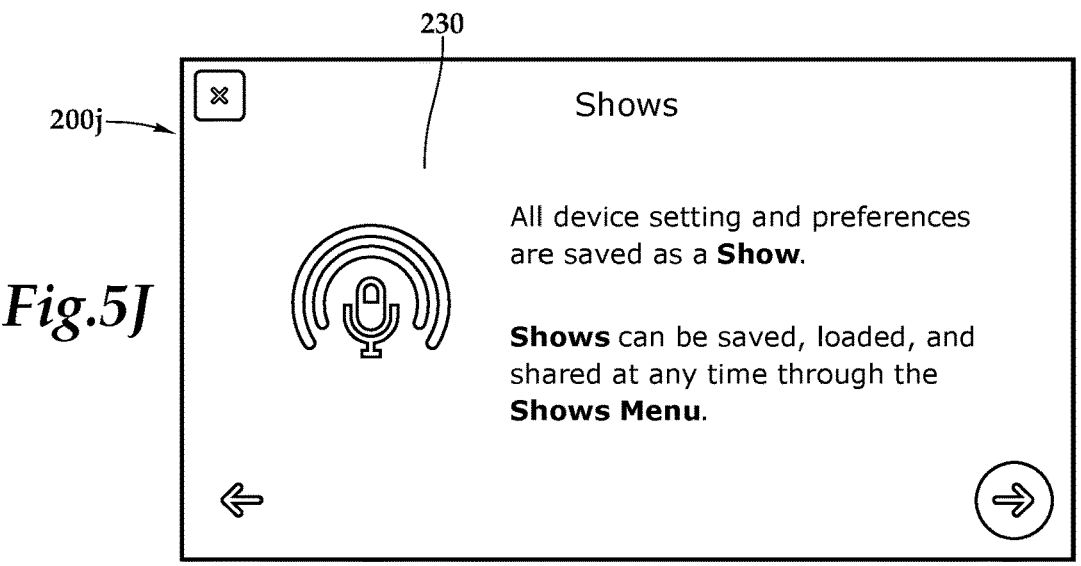
FIG. 5J illustrates an exemplary shows screen displayed via the interface of the audio mixing system.
Figure 5K:
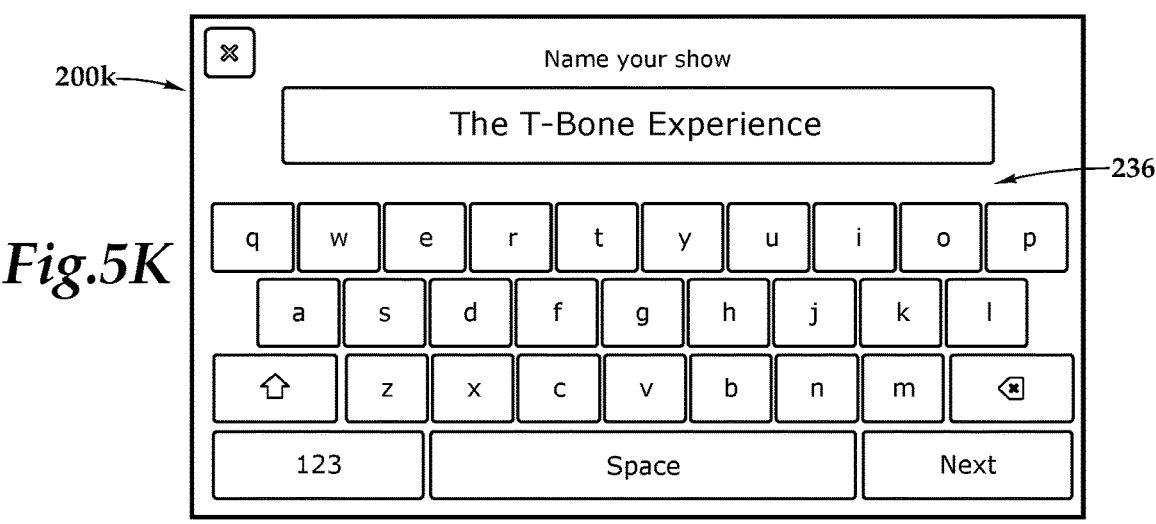
FIG. 5K illustrates an exemplary naming screen displayed via the interface of the audio mixing system.
Figure 5L:
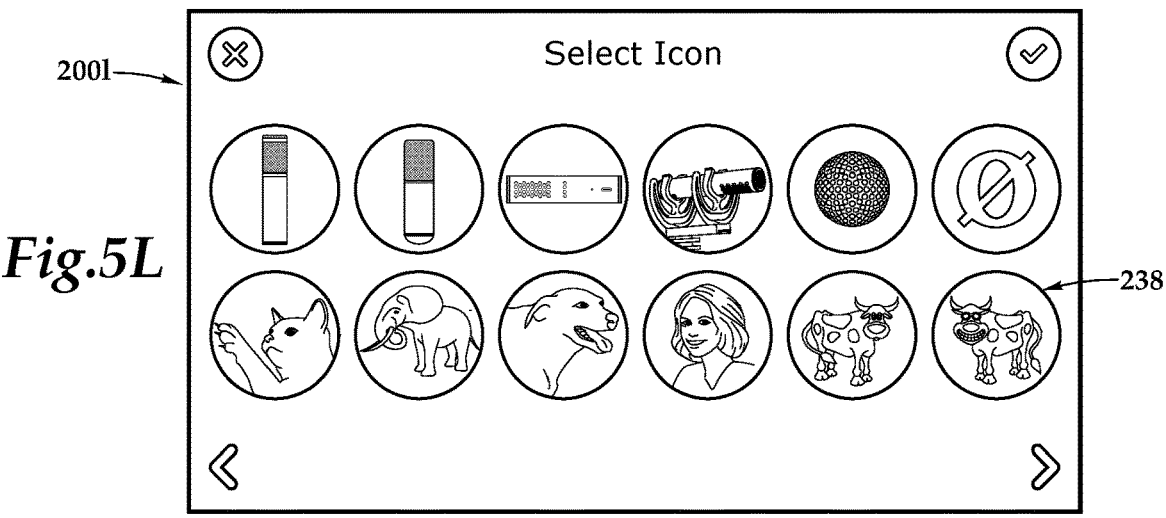
FIG. 5L illustrates an exemplary icon screen displayed via the interface of the audio mixing system.
Figure 5M:
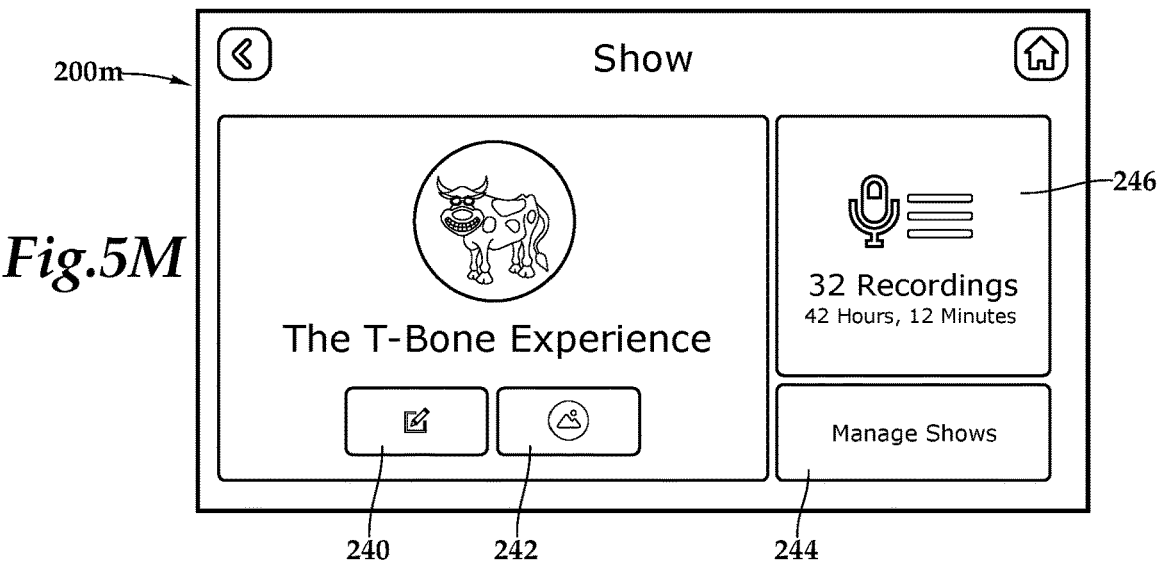
FIG. 5M illustrates an exemplary edit screen displayed via the interface of the audio mixing system.

The exemplary sequence of operations may further include a shows screen 200j as illustrated in FIG. 5J. Shows produced, mixed or recorded via system 100 may be saved, loaded, and/or shared, such as through a wired or wireless connection. In addition, system 100 may facilitate naming a show via a naming screen 200k displayed on interface 124 as illustrated in FIG. 5K. For instance, interface 124 may present a virtual keyboard 236 through use of which a user may key in a name for the corresponding show. Furthermore, shows may be associated with one or more icons 238 through icon screen 200l as illustrated in FIG. 5L. Once an icon is selected, a user may edit the show via edit screen 200m as illustrated in FIG. 5M. Through use of edit screen 200m, a user may change the name of the show via name change button 240, change the icon associated with the show via icon change button 242, manage other created shows via manage button 244 or access recorded shows via recording button 246.

Figure 6A:
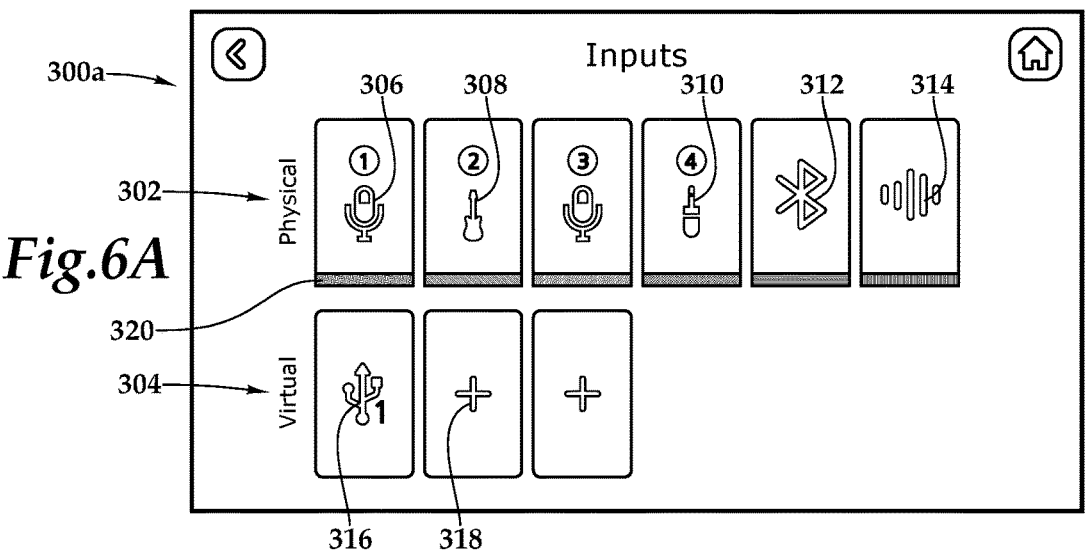
FIG. 6A illustrates an exemplary channel input screen displayed via the interface of the audio mixing system.
Figure 6B:
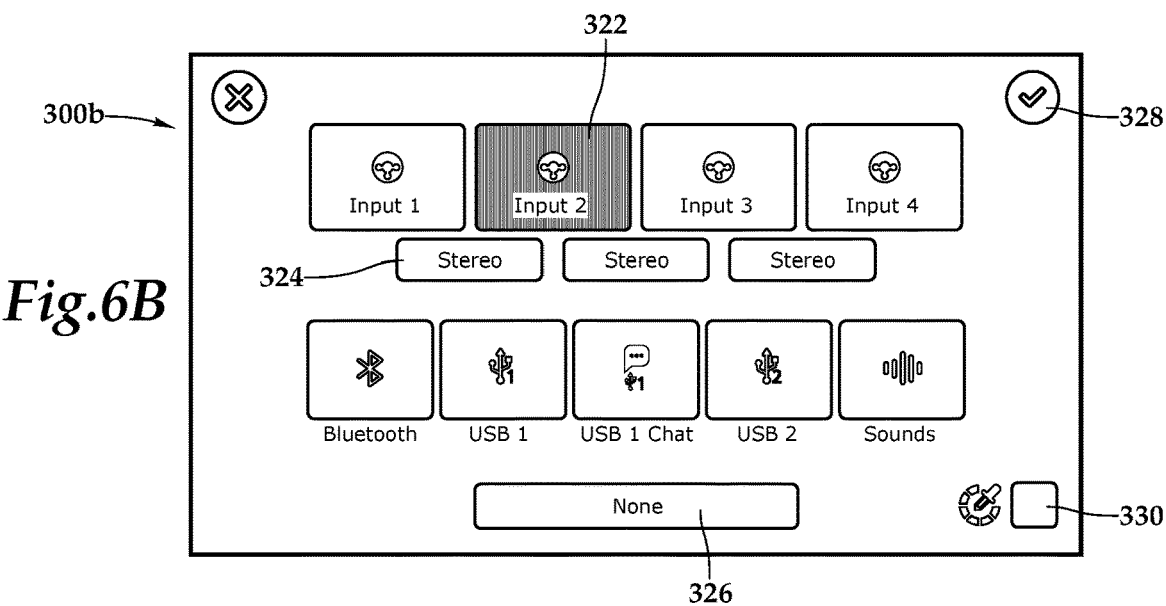
FIG. 6B illustrates an exemplary channel assignment screen displayed via the interface of the audio mixing system.
Figure 6C:
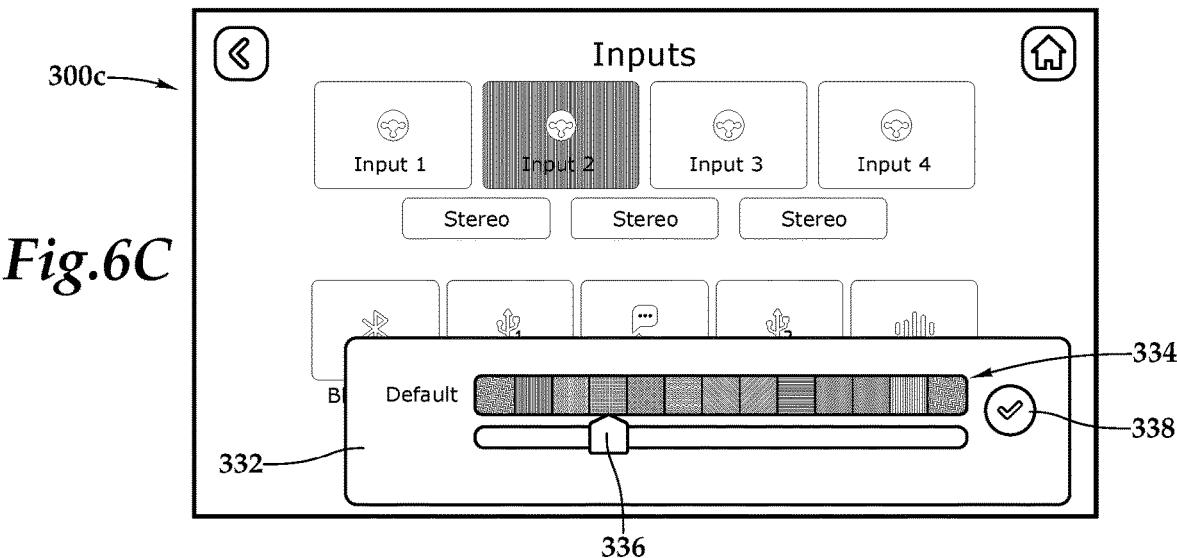
FIG. 6C illustrates an exemplary color selection screen displayed via the interface of the audio mixing system.

FIGS. 6A-6C illustrate an exemplary sequence of channel setup operations that may be displayed via interface 124. More specifically, FIG. 6A illustrates an exemplary input screen 300a. Input screen 300a may display physical channels 302 and virtual channels 304 that correspond to one or more inputs.

Each channel 302, 304 may be associated with one or more audio inputs, which, as shown, may be represented by virtual images or pads. For example, virtual pads may include a microphone symbol 306, a musical instrument symbol 308, a line in symbol 310, a Bluetooth symbol 312, a sound symbol 314, and a USB symbol 316. Also, a plus sign symbol 318 may represent open channels that may be assigned to an audio source.

As shown, physical channels 302 may include an indicator 320, such as bars or strips 320 which may be colored and correspond to a physical control of system 100 as detailed above. Other indicators 320 are contemplated, such as highlighting the one or more symbols or accentuating (e.g., bolding) a boundary associated with physical channels 302.

In response to a user selection of a physical or virtual channel on screen 300a, system 100 may be configured to display assignment screen 300b via interface 124 as shown in FIG. 6B. Assignment screen 300b may facilitate associating or assigning an input channel with one or more audio sources, such as an audio source connected to system 100 via a wired or wireless connection. As shown, in response to a user's selection, a corresponding input audio source 322, illustrated as "Input 2" may be emphasize. For instance, input audio source 322 may be highlighted or accentuated.

Assignment screen 300b may include one or more stereo buttons 324. Stereo buttons 324 may facilitate setting two or more inputs as a stereo pair to, for example, achieve a ganged (or interlocked) relationship between parameters of the two input channels set as the stereo pair. In other words, one or more parameters of the two input are controlled in ganged relation to each other. As a result, a user, through use of assignment screen 300b, may control parameters of two audio signals assigned to one physical or virtual channel.

Furthermore, assignment screen 300b may include a clear button 326. Clear button 326 may facilitate freeing the selected channel such that no audio input sources are assigned to the selected channel. To confirm the selections made on assignment screen 300b, a user may select confirm button 328. In some embodiments, changes made via assignment screen 300b are stored and applied only in response to selection of confirm button 328.

Assignment screen 300b may further include a color assign button 330. In response to selection of color assign button 330, system 100 may be configured to display exemplary color screen 300c as illustrated in FIG. 6C. As shown, screen 300c may include a color menu 332 including one or more colors selections 334 and a slider 336. Through use of exemplary screen 300c, a user may confirm via button 338 assignment of a color to the corresponding input channel.

As detailed above, the selected color may be associated with one or more indicators 320, such as a strip 134 or virtual pad 142 (FIG. 4) displayed via interface 124. Furthermore, one or more physical controls, such as access buttons 138 or physical pads 140, may be configured to illuminate a color matching the selected color via menu 332, thereby representing physical controls of system 100 that correspond to operations displayed via interface 124. For example, in response to a user selecting the color red to associate with a first input channel, a strip or bar related to first input channel on interface 124 may be filled in red, and an access button corresponding to a third physical fader may illuminate red, thereby representing that the third physical fader is assigned to an audio source linked to the first input channel.

FIGS. 7A-7D illustrate an exemplary sequence of virtual pad setup operations that may be displayed via interface 124. The exemplary sequence of operations may be replicated or repeated for each virtual pad 140.

Figure 7A:
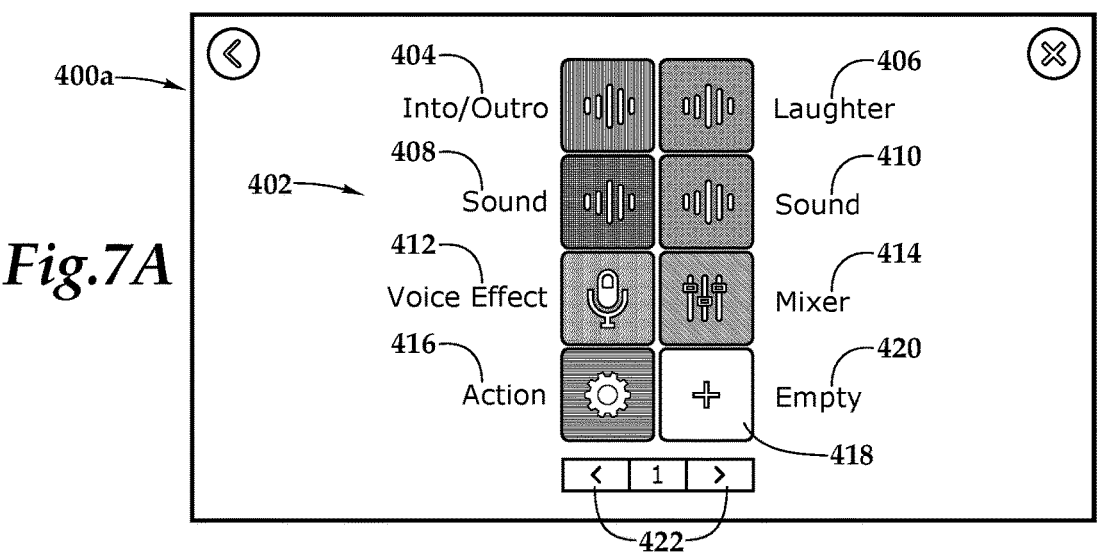
FIG. 7A illustrates an exemplary virtual pad screen displayed via the interface of the audio mixing system.

More specifically, FIG. 7A illustrates an exemplary virtual pad screen 400a. As shown, virtual pad screen 400a may include one or more virtual pads 402, which may be virtual pads 142 (FIG. 4). Each virtual pad 402 may correspond to a predefined action, which may be represented by a symbol and corresponding indicia. Examples of symbols and indicia corresponding to predefined actions include "Intro/Outro" 404, "Laughter" 406, "Sound" 408, 410, "Voice Effect" 412, "Mixer" 414, and "Action" 416.

Virtual pad screen 400a may further include a plus symbol 418 and indicia, such as "Empty" 420 corresponding to open or free pads that may be assigned a predefined action. Further, screen 400a may include scroll buttons 422 by which a user may flip or scroll through stored and/or available virtual pads.

Figure 7B:
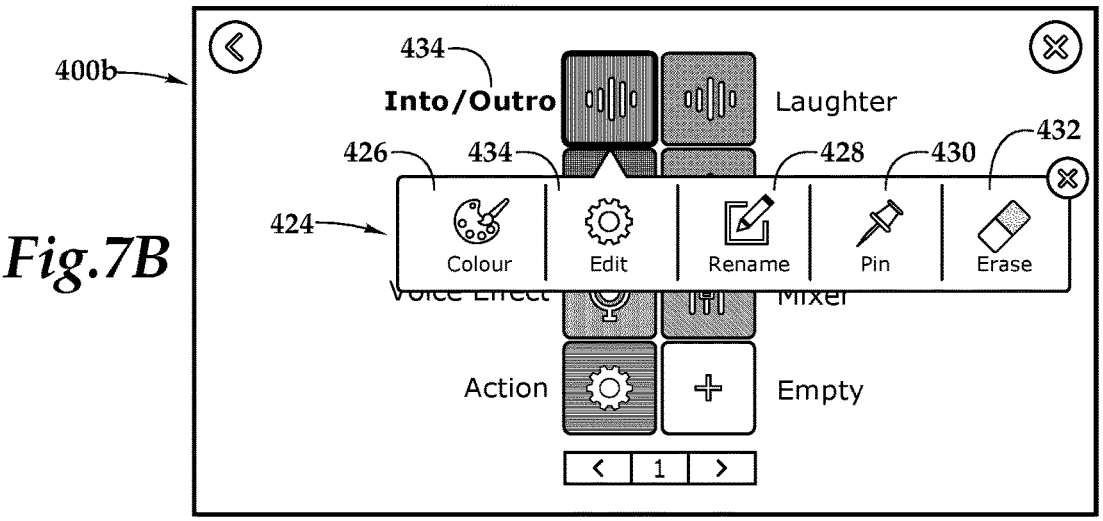
FIG. 7B illustrates an exemplary configurations screen displayed via the interface of the audio mixing system.

In response to a user selection of virtual pad associated with predefined action 404, system 100 may be configured to output an exemplary configuration screen 400b via interface 124, as illustrated in FIG. 7B. As shown, configuration screen 400*b* may include an options menu 424 corresponding to configuration options for predefined action 404. For example, configuration screen 400*b* may include a color button 426, through selection of which, a user may change a color corresponding to predefined action 404. Through selection of rename button 428, a user may edit the name associated with predefined action 404. Through selection of pin button 430, predefined action 404 may be pinned to, for example, home screen 125 (FIG. 4) of interface 124. Configuration screen 400*b* may further include a clear button 432, through selection of which, a user may clear or free the corresponding virtual pad from predefined action 404.

Figure 7C:
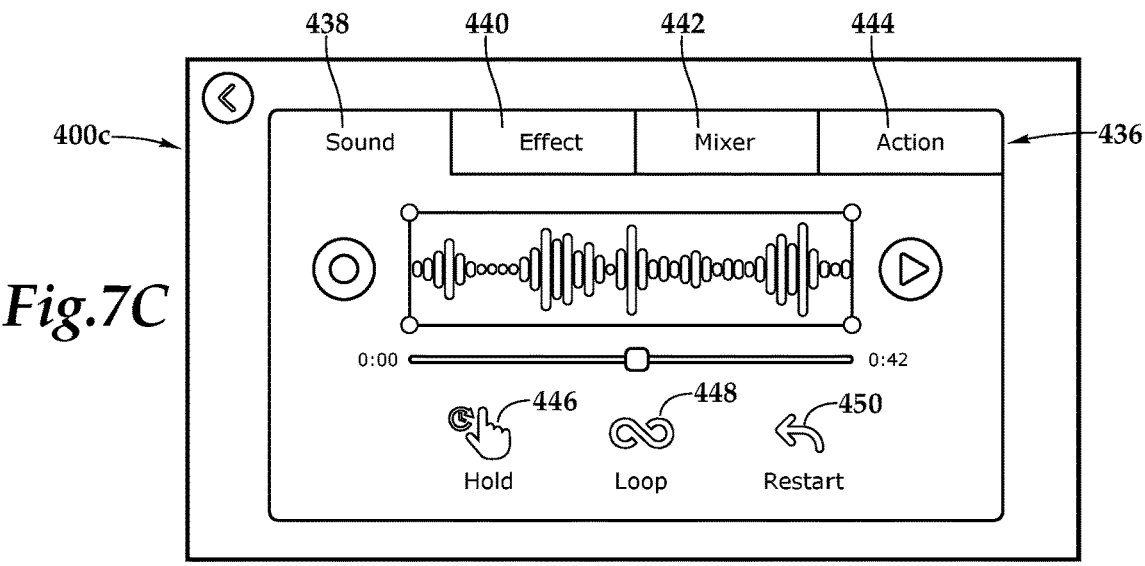
FIG. 7C illustrates an exemplary modifications screen displayed via the interface of the audio mixing system.
Figure 7D:
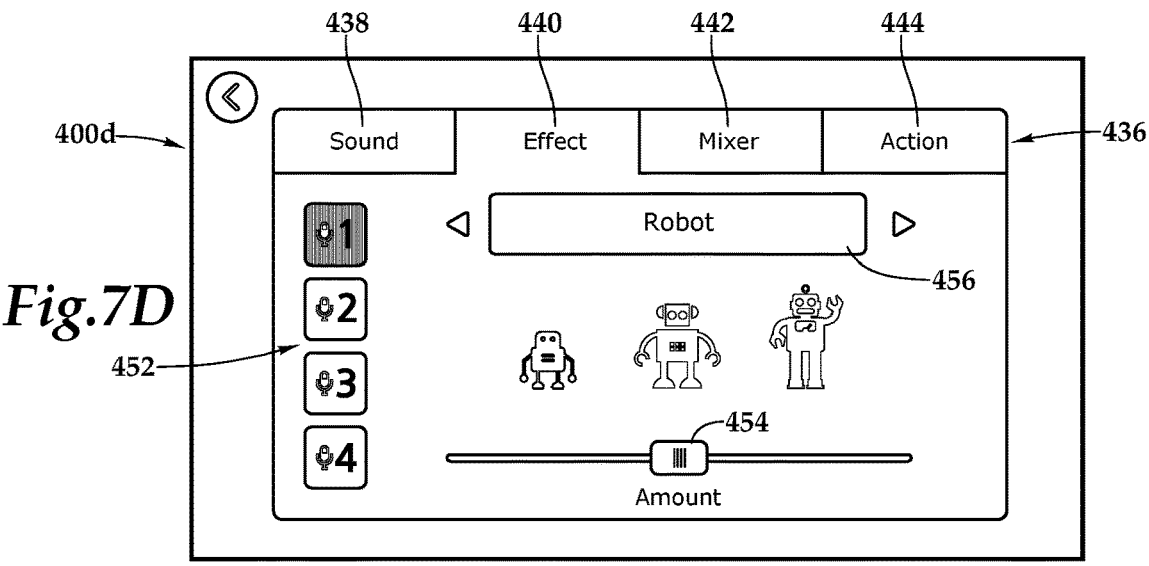
FIG. 7D illustrates another exemplary modifications screen displayed via the interface of the audio mixing system.

Furthermore, configuration screen 400*b* may include an edit button 434. In response to selection of edit button 434, interface 123 may be configured to output an exemplary modification screens 400*c*, 400*d* as illustrated in FIG. 7C and FIG. 7D, respectively. Modification screens 400*c*, 400*d* may including tabs 436 corresponding to, for example, sounds 438, effects 440, mixers 442, and actions 444. Under sound options 438 tab, modification screen 400*c* may present playback controls, such as hold 446, loop 448, and restart 450. Playback controls may correspond to an input or stored audio signal. For example, hold 446 may facilitate selecting a particular section of an audio signal. Loop 448 may facilitate repeating a desired section of an audio signal. Restart 450 may facilitate restarting an audio signal.

Under effects 440 tab, as shown in modification screen 400*d*, may facilitate augmenting an input signal to deliver various desired sound effects. Furthermore, audio effects may be assigned to one or more input sources 452 via screen 400*d*. For examples, singers often use vocal tuning or pitch correction to disguise off-key inaccuracies in vocal tracks. As shown, a control bar 454 may be used to apply a robotic sound effect 456 to an audio signal to produce a diverse range of sounds. Effects may be used to augment or modify a real-time input signal or a recorded audio signal.

Under mixers 442 tab, system 100 may facilitate various mixing options. For example, through use of mixer 442 tab, a user may apply a range of features to an input signal. In one example, mixers may include a ducking feature to facilitate temporarily lowering the volume level of a specified audio signal anytime a second specified audio signal is present. In another example, mixers may include a censor feature for adding a beep sound, thereby removing a portion of an input signal. In yet another example, mixers may include a trash talk feature for muting an audio output to remote guests. Further, mixers are contemplated such as a fade in/out mixer and a back channel mixer, which may be a mix created separate from the main audio signal to allow communication between various input channels of system 100.

Under actions 444 tab, system 100 may facilitate navigating to one or more applying one or more actions to an audio signal. Example of actions may include insertion, audio mixing, echo and sound conversion. Insertion may facilitate inserting one section sound in another section sound. Audio mixing may facilitate mixing one or more audio signals together. Echo may generating an echo effect. Sound conversion may facilitate distorting an audio input or applying an effect. Other actions are contemplated, such as delay, mute, and the like.

Figure 8A:
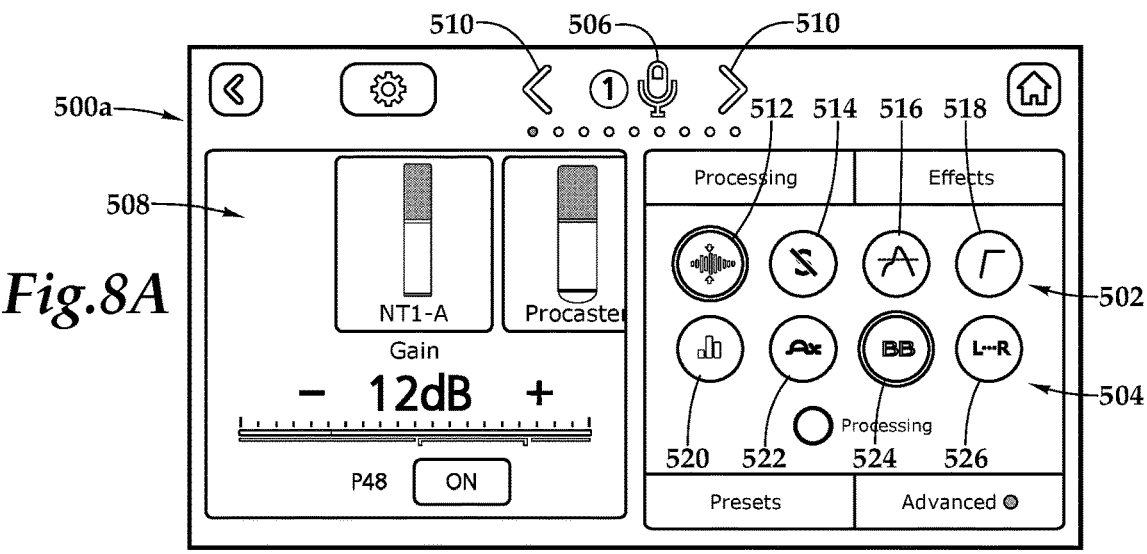
FIG. 8A illustrates an exemplary audio processing screen displayed via the interface of the audio mixing system.
Figure 8B:
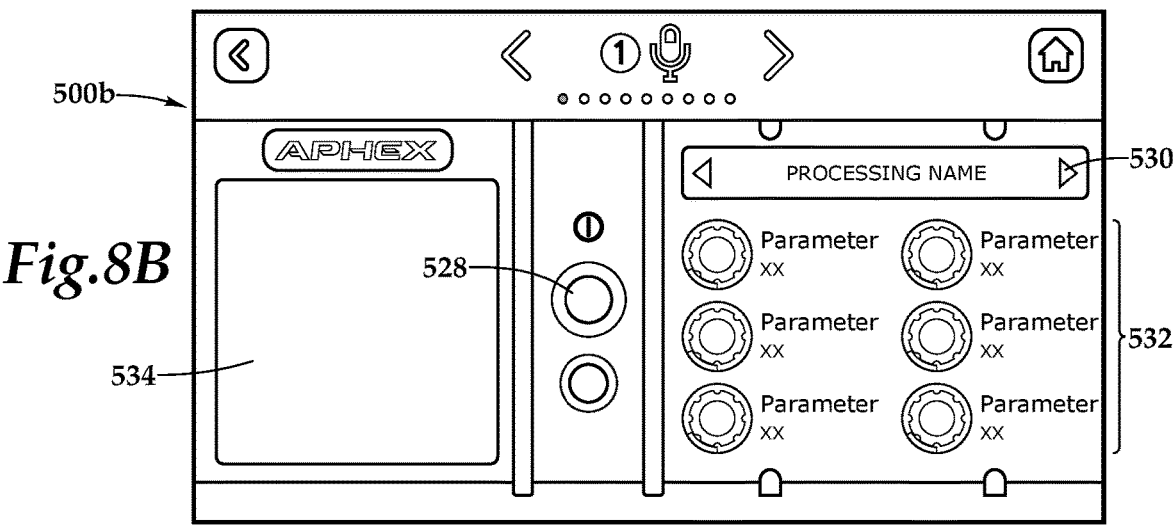
FIG. 8B illustrates an exemplary audio parameters screen displayed via the interface of the audio mixing system.
Figure 8C:
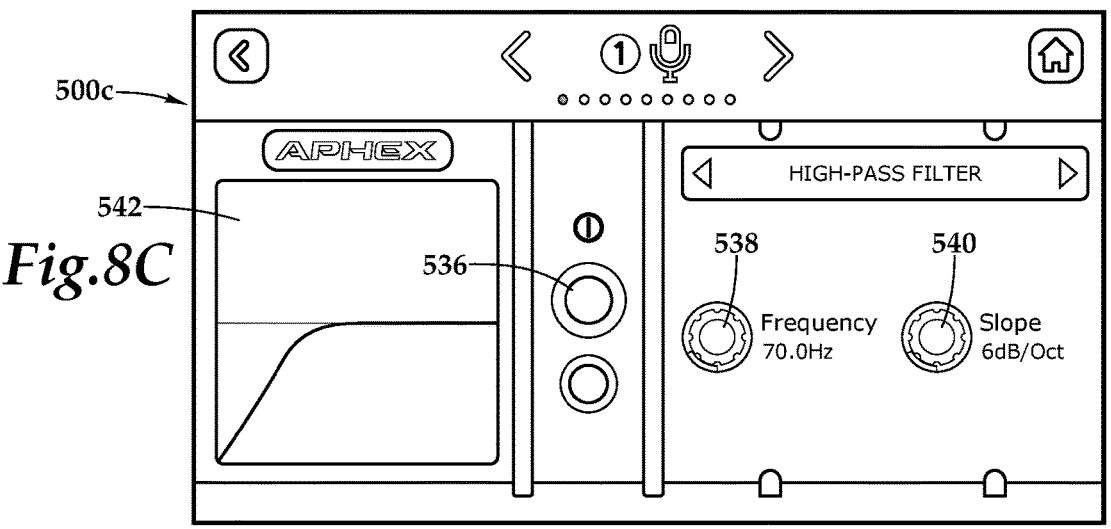
FIG. 8C illustrates an exemplary filter screen displayed via the interface of the audio mixing system.
Figure 8D:
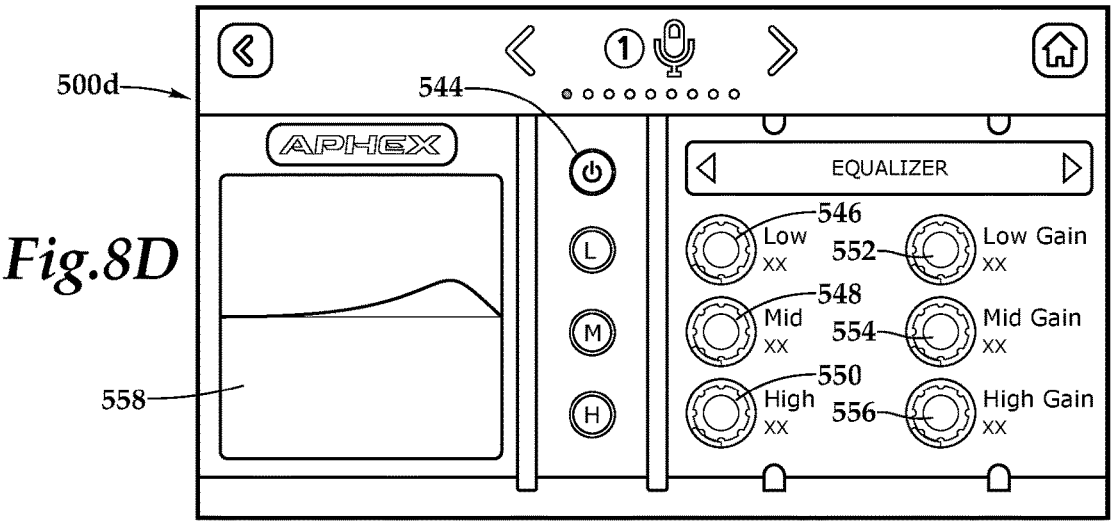
FIG. 8D illustrates an exemplary equalizer screen displayed via the interface of the audio mixing system.
Figure 8E:
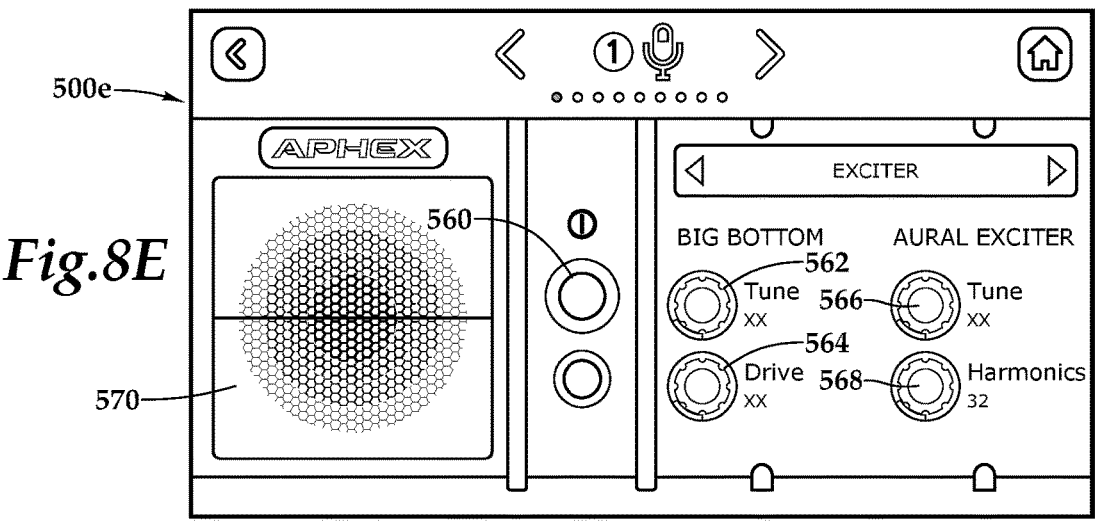
FIG. 8E illustrates an exemplary exciter screen displayed via the interface of the audio mixing system.
Figure 8F:
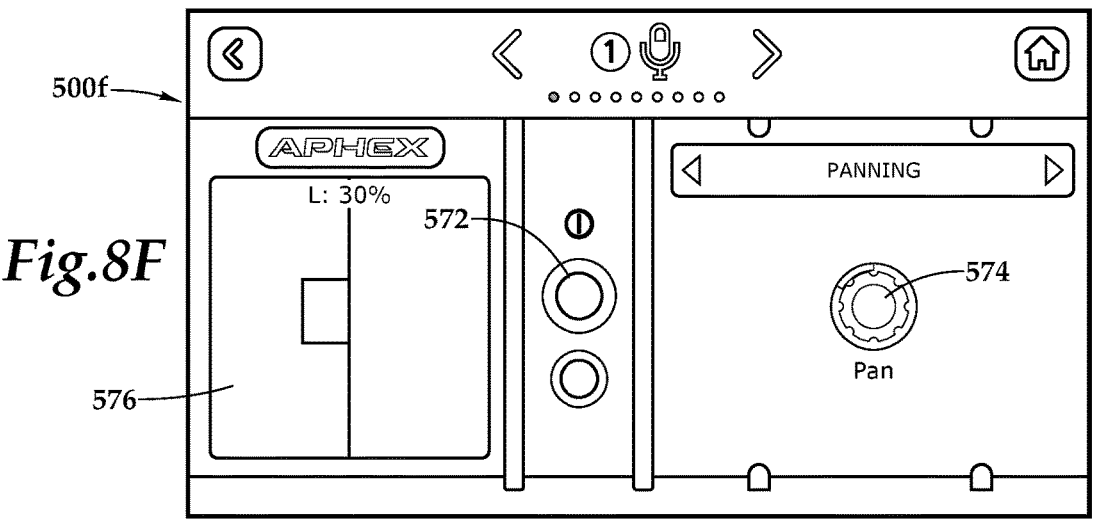
FIG. 8F illustrates an exemplary panning screen displayed via the interface of the audio mixing system.

FIG. 8A through FIG. 8F illustrate exemplary audio properties, parameters and/or characteristics that may be controlled by a user via interface 124. More specifically, FIG. 8A illustrates a processing screen 500*a* including audio processing blocks 502 visually represented in a processing region 504. Processing blocks may correspond to a connected audio source 506, which may be visually represented in an audio source region 508. Other audio sources coupled to system 100 may be accessed via arrows 510.

Through use of processing screen 500*a*, a user may access compressor control 512, de-esser control 514, noise-gate control 516, hi-pass filter control 518, equalizer (EQ) control 520, aural exciter control 522, big bottom control 524, and panning control 526. In addition, via screen 500*a*, a user may tap and hold to active or deactivate one or more audio processing blocks 502.

In response to a user selection of compressor control 512, de-esser control 514 or noise-gate control 516, interface 124 may display parameter screen 500*b*. Parameter screen 500*b* may include an on/off button 528 for turning on or off an associated control 512, 514, 516, each of which may be accessed via arrows 530. For example, a user may use arrows 530 to access compressor control 512 such that parameters 532 corresponding to compressor controls will be displayed on screen 500*b*. A user may then adjust one or more parameters 532 via interface 124 or via a physical control, such as rotary encoder 132. In addition, adjustments made to one or more parameters 532 may be visually represented in adjustment region 534.

In response to a user selection of hi-pass filter control 518, system 100 may display filter screen 500*c*. Filter screen 500*c* may include an on/off button 536 for turning on or off hi-pass filter control 518. When turned on, a user may adjust the frequency 538 and/or slope 540 via interface 124 or via a physical control, such as rotary encoder 132. In addition, adjustments made to frequency 538 and/or slope 540 may be visually represented in adjustment region 542.

In response to a user selection of EQ control 520, system 100 may display equalizer screen 500*d*. Equalizer screen 500*d* may include an on/off button 544 for turning on or off EQ control 520. When turned on, a user may adjust the low 546, medium 548, and high 550 frequency regions of a sound. Each of these adjustments can be applied to either cut or boost its frequency range. In addition, a user may adjust the low gain 552, medium gain 554, and high gain 556. Adjustments may be made via interface 124 or via a physical control, such as rotary encoder 132. In addition, adjustments made to frequency and/or slope gain may be visually represented in adjustment region 558.

In response to a user selection of aural exciter control 522 or big bottom control 524, system 100 may display exciter screen 500*e*. Exciter screen 500*b* may include an on/off button 560 for turning on or off an associated control 522, 524. When turned on, a user may adjust the tune 562 and/or drive 564 corresponding to big bottom control 524. In addition, a user may adjust the tune 566 and/or harmonics 568 corresponding to aural exciter control 522. Adjustments may be made via interface 124 or via a physical control, such as rotary encoder 132. In addition, adjustments made may be visually represented in adjustment region 570.

In response to a user selection of panning control 526, system 100 may display panning screen 500*f*. Panning screen 500*f* may include an on/off button 572 for turning on or off panning control 526. When turned on, a user may adjust the distribution of mono sounds or stereo sounds between the left and right sides of the stereo field via pan setting 574. Adjustments may be made via interface 124 or via a physical control, such as rotary encoder 132. In addition, adjustments made to frequency and/or slope gain may be visually represented in adjustment region 576.

Figure 9:
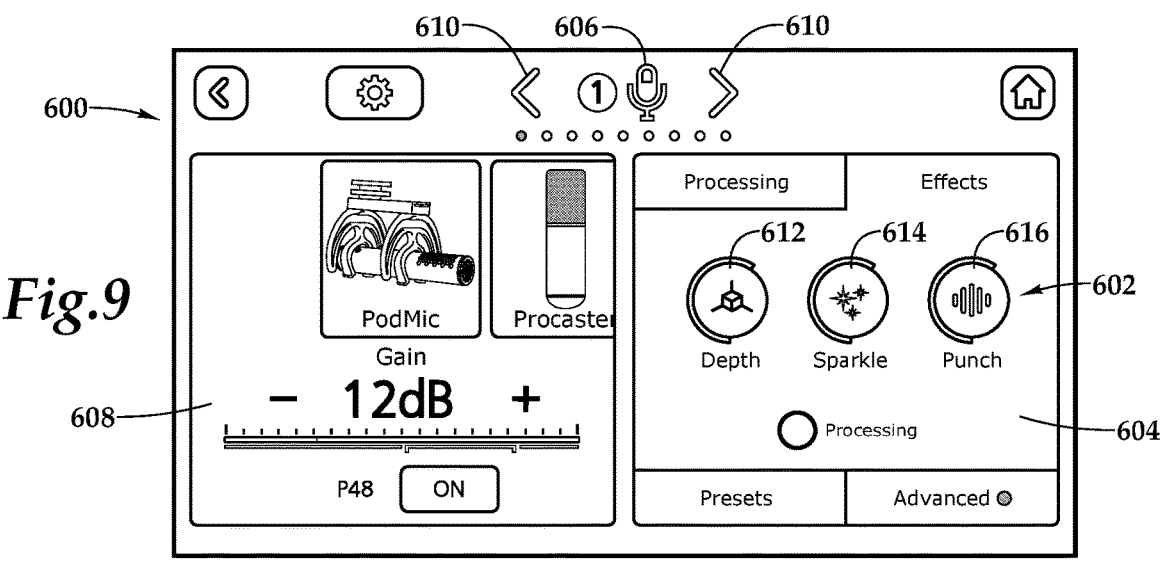
FIG. 9 illustrates an exemplary audio preset screen displayed via the interface of the audio mixing system.

FIG. 9 illustrates an exemplary preset screen 600 that system 100 may be configured to be displayed via interface 124. Through use of preset screen 600, a user may control various preset audio properties visually represented in a preset region 604. Preset audio properties may correspond to a connected audio source 606, which may be visually represented in an audio source region 608. Other audio sources coupled to system 100 may be accessed via arrows 610.

As shown, each preset may include controls 602, such as depth control 612, sparkle control 614, and punch control 616. Controls 612, 614, 616 may be adjusted to change the audio signal, e.g., to output more or less intensity. Through use of preset screen 600, a user is not required to have an extensive amount of knowledge regarding audio processing or technical terminology to apply various audio processing techniques.

More specifically, each control 612, 614, 616 may be mapped to one or more parameters of the audio processing to manipulate sound properties or characteristics of audio signals. In particular, adjustment of controls 612, 614, 616 may automatically correspond to an adjustment of a parameter associated with compressor control 512, de-esser control 514, noise-gate control 516, hi-pass filter control 518, equalizer (EQ) control 520, aural exciter control 522, big bottom control 524, and panning control 526.

In one example, increasing the sparkle control 614 may simultaneously increase the amount of tune 566 and/or harmonics 568 corresponding to aural exciter control 522, increase setting corresponding to EQ control 520 at a specific frequency, and decrease parameters corresponding to de-esser control 514, such as the amount of de-essing applied. The exact amount by which these underlying parameters are adjusted may vary. For the full range of sparkle control 614, the underlying parameter may move over a wide range or a narrow one, with the start and end points for each parameter adjustment being individually defined as part of the present.

Further, the underlying parameters may be linked to controls 612, 614, 616 linearly or nonlinearly. For instance, a 50% change in controls 612, 614, 616 yields a 50% change in the underlying parameter between the defined end points or according to a curve, may accelerate or decelerate the change to the underlying parameter as controls 612, 614, 616 are adjusted. The start point, end point, and curve of every individual parameter may be defined individually for each preset.

In another example, a control displayed via screen 600 may be linked to a first parameter, a second parameter, a third parameter, and a fourth parameter. As a user makes adjustments via the control, each linked parameter may be adjusted linearly or nonlinearly. For instance, first parameter may be changed from 10% to 20% linearly as control is adjusted. Second parameter may change from 5% to 95% on an accelerating curve as control is adjusted. Third parameter may change from 40% to 100% on a decelerating curve as control is adjusted. Fourth parameter may change from 90% to 95% on an ease in and out curve as control is adjusted. Additional parameters and changes are contemplated.

Furthermore, system 100 may facilitate creation of new presets. For instance, additional high-level controls may be created and named. In addition, icons may be associated or created for new controls, each of which may be linked to any number of individual processing parameters. Further, the desired range and acceleration curve may be applied to each control. New controls may be stored via an external or internal memory.

System 100 may further facilitate applying one or more presets for different output devices, such as headphones. Output presets may be used to optimize an output audio signal for specific and generic output devices. For instance, a user may select, via interface 124, a specific headphone brand and/or a generic mode for an output signal, such as high sensitivity or low sensitivity.

Presets for different output devices may modify the overall output level to ensure that the volume is not too loud or too quiet for the corresponding output device. Furthermore, presets may facilitate modifying volume adjustment curves. Volume adjustment curves may correspond to how volume level changes as a corresponding knob, such as knobs 148 (FIG. 1) is turned. This also includes the rate of volume increase and/or decrease as the knob is turned, such that, for example, the level might go up at a slower rate once a certain point is reached. Output presets may also modify the EQ applied to the audio signal to, for example, provide boosts or cuts to specific audio frequencies to compensate for frequency imbalances in output device.

Exemplary System

Figure 10:
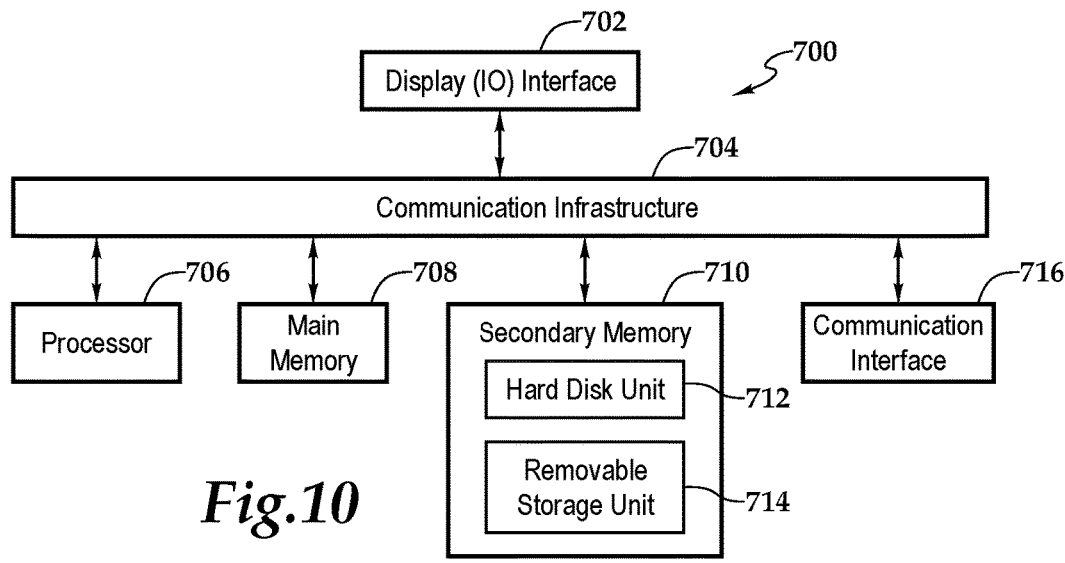
FIG. 10 illustrates an exemplary computing system that may be used for implementation of all or a portion of the system.

FIG. 10 illustrates a diagram of a system of which may be an embodiment of the present disclosure. System 700 includes an input/output interface 702 connected to communication infrastructure 704—such as a bus—which forwards data such as audio, graphics, text, and information, from the communication infrastructure 704 or from a frame buffer (not shown) to other components of the system 700. The input/output interface 702 may be, for example, a touchscreen, a display device, a keyboard, touch screen, joystick, trackball, mouse, monitor, speaker, printer, VR unit, web camera, any other computer peripheral device, or any combination thereof, capable of inputting, receiving, and/or viewing data.

System 700 includes one or more processors 706, which may be a special purpose or a general-purpose digital signal processor configured to process certain information. System 700 also includes a main memory 708, for example random access memory (RAM), read-only memory (ROM), mass storage device, or combinations of each. System 700 may also include a secondary memory 710 such as a hard disk unit 712, a removable storage unit 714, or combinations of each. System 700 may also include a communication interface 716, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 708, secondary memory 710, communication interface 716, or combinations of each, function as a computer usable storage medium, otherwise referred to as a computer readable storage medium, to store and/or access computer software including computer instructions. For example, computer programs or other instructions may be loaded into the system 700 such as through a removable storage device, for example, a floppy disk, ZIP disks, magnetic tape, portable flash drive, optical disk such as a CD or DVD or Blu-ray, Micro-Electro-Mechanical Systems (MEMS), nano-technological apparatus. Specifically, computer software including computer instructions may be transferred from the removable storage unit 714 or hard disc unit 712 to the secondary memory 710 or through the communication infrastructure 703 to the main memory 708 of the system 700.

Communication interface 716 allows software, instructions and data to be transferred between the system 700 and external devices or external networks. Software, instructions, and/or data transferred by the communication interface 716 are typically in the form of signals that may be electronic, electromagnetic, optical or other signals capable of being sent and received by the communication interface 716. Signals may be sent and received using wire or cable, fiber optics, a phone line, a cellular phone link, a Radio Frequency (RF) link, wireless link, or other communication channels.

Computer programs, when executed, enable system 700, particularly the processor 706, to implement the disclosed methods according to computer software including instructions.

System 700 described may perform any one of, or any combination of, the steps of any of the methods according to the invention. It is also contemplated that the methods according to the invention may be performed automatically.

The system 700 of FIG. 10 is provided only for purposes of illustration, such that the invention is not limited to this specific embodiment. It is appreciated that a person skilled in the relevant art knows how to program and implement the invention using any computer system.

System 700 may be a handheld device and include any small-sized computer device including, for example, a personal digital assistant (PDA), hand-held computing device, cellular telephone, or a laptop or netbook computer, mobile system, tablet, or similar hand held computer device, such as an iPad, iPad Touch or iPhone.

Exemplary Cloud Computing System

Figure 11:
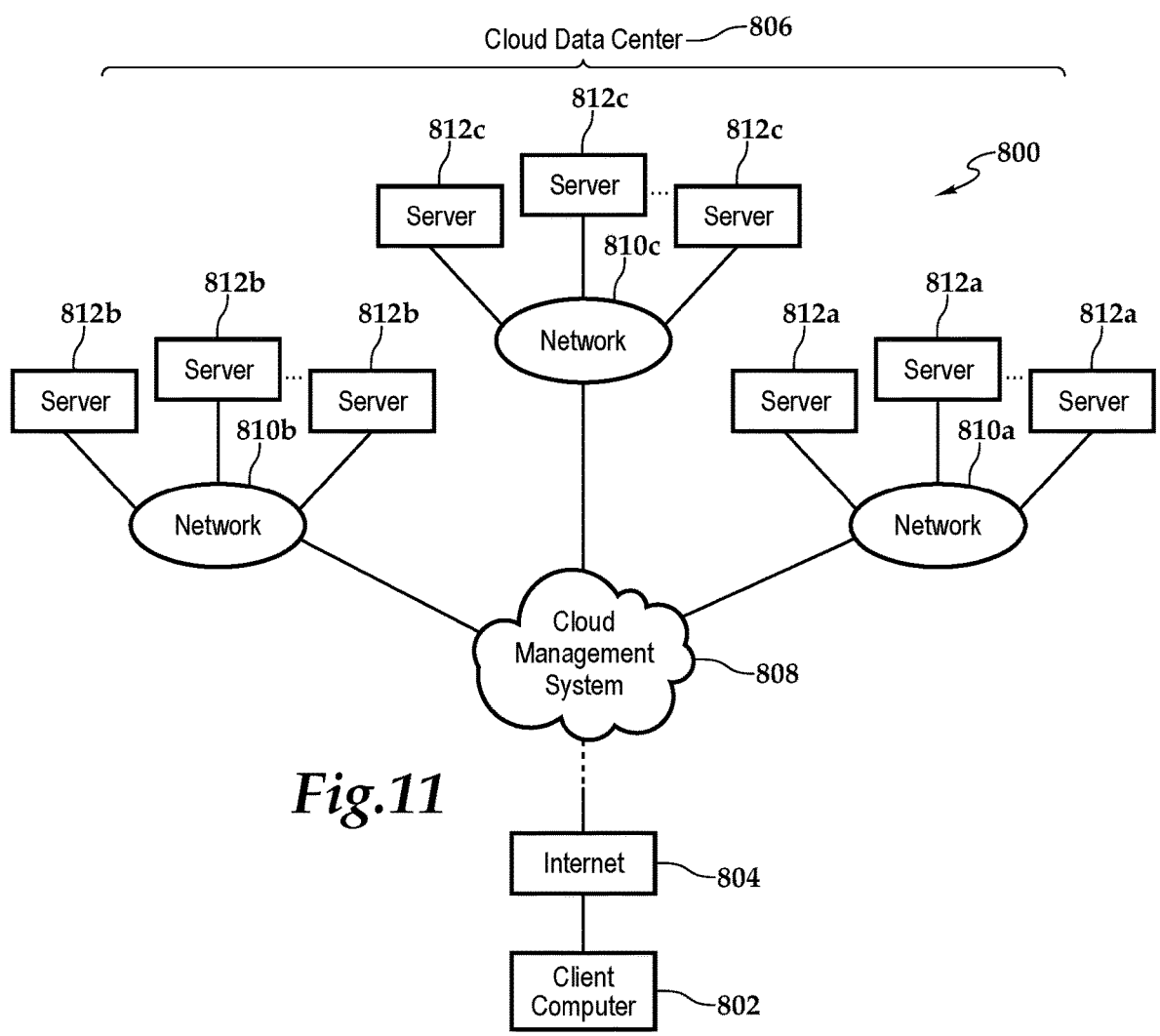
FIG. 11 is an exemplary cloud computing system that may be used for implementation of all or a portion of the system.

FIG. 11 illustrates an exemplary cloud computing system 800 that may be an embodiment of the present invention. The cloud computing system 800 includes a plurality of interconnected computing environments. The cloud computing system 800 utilizes the resources from various networks as a collective virtual computer, where the services and applications can run independently from a particular computer or server configuration making hardware less important.

Specifically, the cloud computing system 800 includes at least one client computer system 802, such as system 700. The client computer 802 may be any device through the use of which a distributed computing environment may be accessed to perform the methods disclosed herein, for example, a traditional computer, portable computer, mobile phone, personal digital assistant, tablet to name a few. The client computer 802 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 802 also may include a communications interface, for example, a modem, a network interface (such as an Ethernet card), a communications port, a PCM-CIA slot and card, wired or wireless systems, etc. The communications interface allows communication through transferred signals between the client computer 802 and external devices including networks such as the Internet 804 and cloud data center 806. Communication may be implemented using wireless or wired capability such as cable, fiber optics, a phone line, a cellular phone link, radio waves or other communication channels.

The client computer 802 establishes communication with the Internet 804—specifically to one or more servers—to, in turn, establish communication with one or more cloud data centers 806. A cloud data center 806 includes one or more networks 810*a*, 810*b*, 810*c* managed through a cloud management system 808. Each network 810*a*, 810*b*, 810*c* includes resource servers 812*a*, 812*b*, 812*c*, respectively. Servers 812*a*, 812*b*, 812*c* permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 808 can comprise a dedicated or centralized server and/or other software, hardware, and network tools to communicate with one or more networks 810*a*, 810*b*, 810*c*, such as the Internet or other public or private network, with all sets of resource servers 812*a*, 812*b*, 812*c*. The cloud management system 808 may be configured to query and identify the computing resources and components managed by the set of resource servers 812*a*, 812*b*, 812*c* needed and available for use in the cloud data center 806. Specifically, the cloud management system 808 may be configured to identify the hardware resources and components such as type and amount of processing power, type and amount of memory, type and amount of storage, type and amount of network bandwidth and the like, of the set of resource servers 812*a*, 812*b*, 812*c* needed and available for use in the cloud data center 806. Likewise, the cloud management system 808 can be configured to identify the software resources and components, such as type of Operating System (OS), application programs, and the like, of the set of resource servers 812*a*, 812*b*, 812*c* needed and available for use in the cloud data center 806.

The present invention is also directed to computer products, otherwise referred to as computer program products, to provide software to the cloud computing system 800. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 800 of FIG. 11 is provided only for purposes of illustration and does not limit the invention to this specific embodiment. It is appreciated that a person skilled in the relevant art knows how to program and implement the invention using any computer system or network architecture.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. A system for recording and distributing content comprising:
   a plurality of input channels to which one or more audio sources is linked;
   one or more faders comprising at least one of a physical fader and a virtual fader, each fader configured to be assigned to the one or more linked audio source;
   a graphical interface configured to receive user inputs, said interface configured to display one or more indicators visually corresponding to one or more physical controls;
   a processor operatively coupled to a non-volatile, non-transitory memory, the input channels, the faders, said controls, and said interface, the processor operative to:
      detect a connection to an audio source;
      output, via said interface, a set-up screen configured to receive a user input for linking the audio source to said one or more input channels;
      assign, in response to the user input, the audio source to at least one of said physical fader and virtual fader;
      adjust, via said at least one fader linked to the audio source, a level of an audio signal received from the audio source; and
      present, via said interface, a real-time display of said level corresponding to the audio signal received from the audio source.

2. The system of claim 1, further comprising a transceiver operatively coupled to said processor, said transceiver configured to facilitate wireless communication with at least one mobile device.

3. The system of claim 2, wherein said transceiver further configured to receive one or more input controls corresponding to one or more audio properties associated with the audio signal.

4. The system of claim 1, further comprising one or more connectors for coupling to one or more devices.

5. The system of claim 4, wherein said one or more connectors is a USB connector configured to facilitate bi-direction communication with the one or more devices.

6. The system of claim 4, wherein said one or more connectors is at least one of a XLR input port, TRS input port, a headphone output port, a speaker output port, and combinations of each.

7. The system of claim 4, further comprising one or more knobs operatively coupled to said processor, said knobs configured to adjust a level of said audio signal output to the one or more devices.

8. The system of claim 1, wherein said processor is further operative to display said indicators as strips, each strip having a color selectable by a user.

9. The system of claim 8, wherein said processor is further operative to illuminate said one or more controls to match said color of said strip.

10. The system of claim 1, wherein said controls are one or more physical pads, each pad associated with a predefined action.

11. The system of claim 10, wherein said predefined action is a recorded audio signal.

12. The system of claim 1, wherein said controls are one or more access buttons, each button assignable to said one or more input channels.

13. The system of claim 1, further comprising a rotary encoder operatively coupled to said processor, said rotary encoder configured to control said virtual faders assigned to said one or more audio sources.

14. The system of claim 1, wherein said audio source is linked to two or more faders.

15. The system of claim 1, wherein said interface includes at least one region representing audio sources linked to said one or more physical faders and another region representing audio sources linked to said one or more virtual faders.

16. The system of claim 1, further comprising one or more audio processing presets, each audio preset mapped to control audio properties corresponding to the signal received from the audio source.

17. The system of claim 15, wherein said one or more processing presets is associated with at least one of a microphone, musical instrument, and headphones.

18. The system of claim 1, further comprising a recording module operatively coupled to said processor, said recording module operable to record a podcast for distribution.

19. A method for recording and distributing content comprising:
   detecting a connection to an audio source;
   outputting, via an interface, a set-up screen configured to receive a user input;
   linking, in response to the user input, said audio source to one or more input channels;
   assigning the audio source to at least one of a physical fader and a virtual fader;
   adjusting, via said at least one fader linked to the audio source, a level of a signal received from the audio source; and
   presenting, via said interface, a real-time display of said level corresponding to the signal received from the audio source.

20. The method of claim 19, wherein said detection step further comprises wirelessly connecting to said audio source.

21. The method of claim 19, wherein said detection step further comprises connecting to said audio source via a wired connection.

22. The method of claim 19, further comprising receiving one or more input controls corresponding to one or more audio properties associated with the audio signal.

23. The method of claim 19, wherein said outputting step further comprising displaying one or more indicators on said interface, said indicators visually corresponding to one or more controls.

24. The method of claim 23, wherein said indicators are displayed as strips, each strip having a color selectable by a user.

25. The method of claim 24, wherein the one or more controls is configured to illuminate to match the color of said one or more strips.

26. The method of claim 23, wherein said controls are one or more physical pads, each pad associated with a predefined action.

27. The method of claim 26, wherein said predefined action is a recorded audio signal that is output in response to a user selection.

28. The method of claim 23, wherein said controls are one or more access buttons, each button assignable to said one or more input channels.

29. The method of claim 19, further comprising controlling said virtual faders assigned to the audio source via a rotary encoder.

30. The method of claim 19, wherein said presenting step further comprising displaying at least one region representing audio sources linked to said one or more physical faders and another region representing audio sources linked to said one or more virtual faders.

31. The method of claim 19, further comprising processing said audio signal according to one or more present, each preset mapped to control an audio property of said audio signal.

32. The method of claim 31, wherein said one or more presets is associated with at least one of a microphone, musical instrument, and headphones.

33. The method of claim 19, further comprising recording a podcast via a recording module for distribution to one or more remote devices.

* * * * *